(12) United States Patent
Hensel

(10) Patent No.: US 12,496,850 B2
(45) Date of Patent: Dec. 16, 2025

(54) WHEEL ASSEMBLY, LOCK-RING FOR WHEEL ASSEMBLY, HANDLE ENGAGEABLE WITH LOCK-RING, AND RELATED METHODS

(71) Applicant: OTR Wheel Engineering, Inc., Rome, GA (US)

(72) Inventor: Leonard Austin Hensel, Rome, GA (US)

(73) Assignee: OTR Wheel Engineering Inc., Rome, GA (US)

( * ) Notice: Subject to any disclaimer, the term of this patent is extended or adjusted under 35 U.S.C. 154(b) by 817 days.

(21) Appl. No.: 17/772,887

(22) PCT Filed: Oct. 30, 2020

(86) PCT No.: PCT/US2020/058219
§ 371 (c)(1),
(2) Date: Apr. 28, 2022

(87) PCT Pub. No.: WO2021/087263
PCT Pub. Date: May 6, 2021

(65) Prior Publication Data
US 2022/0410621 A1    Dec. 29, 2022

Related U.S. Application Data

(60) Provisional application No. 62/928,915, filed on Oct. 31, 2019.

(51) Int. Cl.
*B60B 25/18* (2006.01)
*B60B 25/20* (2006.01)

(52) U.S. Cl.
CPC ............. *B60B 25/18* (2013.01); *B60B 25/20* (2013.01); *B60B 2320/10* (2013.01)

(58) Field of Classification Search
CPC ....... B60B 25/045; B60B 25/14; B60B 25/18; B60B 25/20; B60B 2320/10
See application file for complete search history.

(56) References Cited

U.S. PATENT DOCUMENTS

| 503,369 A | 8/1893 | Holliday et al. |
| 508,597 A | 11/1893 | Blaze |

(Continued)

FOREIGN PATENT DOCUMENTS

| AU | 2012200379 A1 | 8/2012 |
| CN | 102390221 A | 3/2012 |

(Continued)

OTHER PUBLICATIONS

International Preliminary Report on Patentability for corresponding International Application No. PCT/US20/58219, mailed May 12, 2022 (9 pages).

(Continued)

*Primary Examiner* — Kip T Kotter
(74) *Attorney, Agent, or Firm* — Lee & Hayes, P.C.

(57) ABSTRACT

A lock-ring system may include one or more lock-ring sections configured to at least partially define an annular lock-ring and one or more coupler plates configured to couple a first ring section end of a first lock-ring section to either a second ring section end of the first lock-ring section or to a ring section end of a second lock-ring section. The one or more coupler plates may be configured to be received in ring recesses of the one or more lock-ring sections. The one or more coupler plates may be coupled to the one or more ring section ends by fasteners and may be configured to slide relative to the ring recesses when the fasteners are loosened, so that a lock-ring formed by the one or more lock-ring sections may be mounted on, or removed from, a wheel assembly. A handle may be used to assist with maintaining separation of the lock-ring sections during (Continued)

handling and to assist with handling the lock-ring during removal and installation of the lock-ring on a wheel assembly.

18 Claims, 16 Drawing Sheets

(56) References Cited

U.S. PATENT DOCUMENTS

| | | | |
|---|---|---|---|
| D35,075 | S | 9/1901 | Maclulich |
| 1,049,442 | A | 1/1913 | Booth |
| 1,416,187 | A | 5/1922 | Hensel |
| 2,367,788 | A | 1/1945 | Jeune |
| 3,608,607 | A | 9/1971 | Gerbeth |
| 4,683,930 | A | 8/1987 | Elam et al. |
| 4,757,851 | A * | 7/1988 | Van Den Abeele .... B60B 25/14 152/410 |
| 6,786,259 | B2 * | 9/2004 | Vehar ................. B60B 25/18 152/410 |
| D503,369 | S | 3/2005 | Kato |
| 7,819,154 | B2 * | 10/2010 | Durif ................. B60B 25/14 152/410 |
| D703,604 | S | 4/2014 | Milicevic et al. |
| 9,079,456 | B2 | 7/2015 | Oba et al. |
| D747,257 | S | 1/2016 | Bowden |
| 9,370,966 | B2 | 6/2016 | Rathbone et al. |
| D833,953 | S | 11/2018 | Hughes |
| 10,226,962 | B2 * | 3/2019 | Champion ........... B64C 25/36 |
| 10,464,372 | B2 | 11/2019 | Hensel et al. |
| D891,350 | S | 7/2020 | Taqvi |
| D904,964 | S | 12/2020 | Taqvi |
| D945,944 | S | 3/2022 | Carbis et al. |
| D981,316 | S | 3/2023 | Hensel |
| 2010/0164275 | A1 | 7/2010 | Oba et al. |
| 2012/0201681 | A1 | 8/2012 | Chauveau et al. |
| 2012/0313423 | A1 | 12/2012 | Brown et al. |
| 2014/0182759 | A1 | 7/2014 | Phillis et al. |
| 2014/0292060 | A1 | 10/2014 | Phillis et al. |
| 2015/0007919 | A1 * | 1/2015 | Gao ................. B60B 25/18 152/409 |
| 2015/0028661 | A1 | 1/2015 | Cahill |
| 2015/0231924 | A1 | 8/2015 | Hensel et al. |
| 2016/0311254 | A1 | 10/2016 | Dahl |
| 2017/0106694 | A1 | 4/2017 | Baden et al. |
| 2018/0319210 | A1 | 11/2018 | Lo |
| 2019/0366523 | A1 | 12/2019 | Mcmunn et al. |
| 2022/0055402 | A1 | 2/2022 | Garapati et al. |
| 2022/0410621 | A1 | 12/2022 | Hensel |
| 2023/0150300 | A1 | 5/2023 | Finke |

FOREIGN PATENT DOCUMENTS

| | | |
|---|---|---|
| CN | 107531090 A | 1/2018 |
| FR | 560103 A | 9/1923 |
| WO | WO03064183 A1 | 8/2003 |

OTHER PUBLICATIONS

Made-In-China, "Mining OTR Wheel Component Wheel Lock Ring", retrieved Aug. 9, 2024, at <<https://qdjggroup.en.made-in-china.com/producUoyqQMGkPHNu/China-Mining-OTR-Wheel-Component-Wheel-Lock-Ring.html>>, 2024, 4 pgs.

OTR Engineered Solutions, "LOADER Wheels", OTR Wheel, retrieved Aug. 9, 2024, at <<https://www.otrwheel.com/product/wheels-loader/>>, 1 pg.

Rimex, "Locking Ring Profiles", retrieved Aug. 9, 2024, at <<https://www.rimex.com/products/wheel-components/lock-rings/>>,2024, 4 pgs.

The PCT Search Report and Written Opinion mailed Jan. 26, 2021 for PCT Application No. PCT/US20/58219, 15 pages.

EN Technical guidlines for changing OTR tyres retrieved at <<https://static1.squarespace.com/static/5a6e3840a8b2b0782f3ad6aa/t/6154617766bd01548ef9069e/1632923513923/EN_Technincal+guidlines+for +changing+OTR+tyres.pdf>>, dated Sep. 20, 2021, 9 pgs.

Restriction Requirement mailed Jul. 28, 2022 in U.S. Appl. No. 29/711,547 entitled "Wheel Lock Ring Assembly" ( 5 pages).

Communication Pursuant to Article 94(3) EPC issued Mar. 19, 2024 by the European Patent Office for corresponding European Application No. 208124477.6-1012 (6 pages).

Office Action for Chinese Application No. 202080089780.5, Dated May 14, 2025, 14 pages.

* cited by examiner

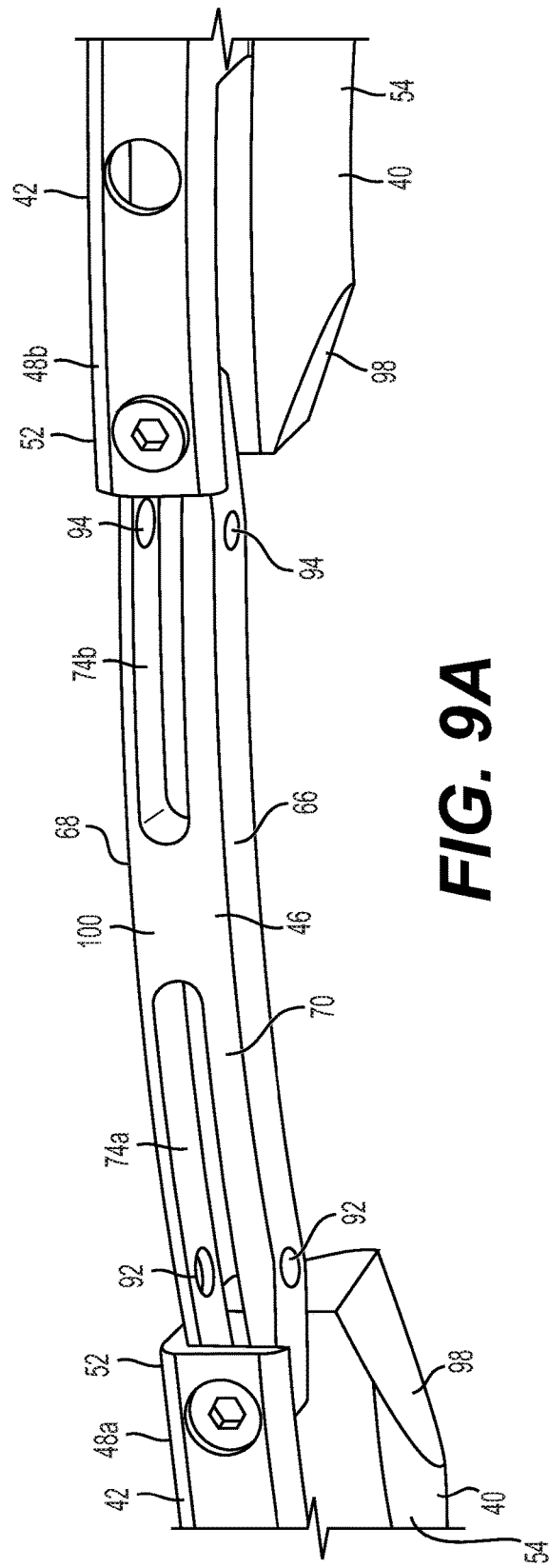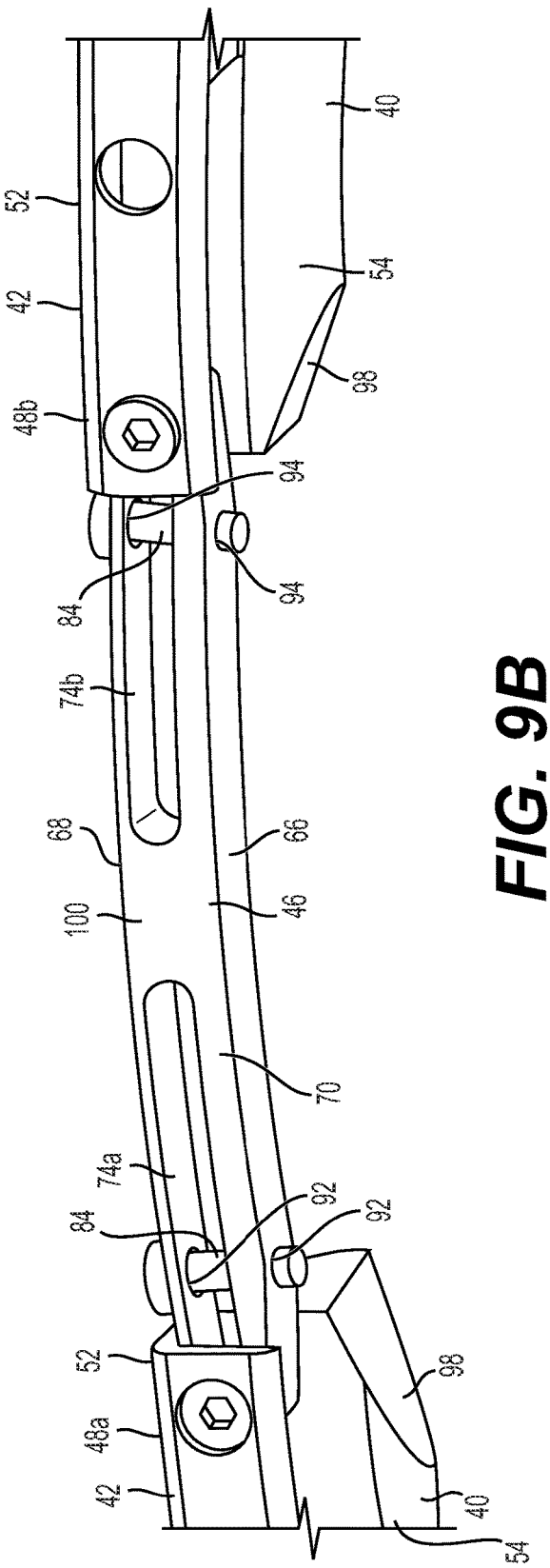

WHEEL ASSEMBLY, LOCK-RING FOR WHEEL ASSEMBLY, HANDLE ENGAGEABLE WITH LOCK-RING, AND RELATED METHODS

CROSS-REFERENCE TO RELATED APPLICATION

This application is a U.S. national stage application under 35 U.S.C. § 371 of PCT International Application No. PCT/US2020/058219, filed Oct. 30, 2020, which claims the benefit of priority to U.S. Provisional Patent Application No. 62/928,915 entitled "Wheel Assembly, Lock-Ring for Wheel Assembly, Handle Engageable with Lock-Ring, and Related Methods," filed Oct. 31, 2019, which is expressly incorporated herein by reference in its entirety.

TECHNICAL FIELD

The present disclosure relates to wheel assemblies, lock-rings for wheel assemblies, handles engageable with lock-rings, and related methods.

BACKGROUND

Some wheel assemblies for vehicles include a retaining ring intended to help retain a tire on the wheel assembly. For example, wheel assemblies for mounting particularly large tires may include a retaining ring to assist with retaining the tire on the wheel assembly. However, it has been found that at least some such retaining rings may be difficult to remove. In addition, some such retaining rings may be relatively large, heavy, and cumbersome for an individual to handle, for example, during removal from the wheel assembly or installation onto the wheel assembly. The wheel assemblies, lock-rings, handles, and/or related methods described herein may be directed to addressing one or more of these possible drawbacks.

SUMMARY

According to a first aspect, a lock-ring system may include a lock-ring section configured to at least partially define an annular lock-ring and define a curved longitudinal axis extending along a length of the lock-ring section between a first ring section end and a second ring section end. The lock-ring section may define a ring cross-section perpendicular to the longitudinal axis, and the ring cross-section may include a ring outer surface and a ring inner surface opposite the ring outer surface. One of the ring inner surface or the ring outer surface may define a ring recess configured to at least partially receive a coupler plate. The ring cross-section may also define a first ring side wall and a second ring side wall opposite the first ring side wall. The lock-ring section may include a first ring aperture defined adjacent the first ring section end and extending between one of: (1) the first ring side wall and the second ring side wall, or (2) the ring outer surface and the ring inner surface. The lock-ring section may also include a second ring aperture defined adjacent the second ring section end and extending between one of: (1) the first ring side wall and the second ring side wall, or (2) the ring outer surface and the ring inner surface.

The lock-ring system may further include a coupler plate configured to couple the first ring section end to one of the second ring section end or a ring section end of a second lock-ring section. The coupler plate may include a plate outer surface, a plate inner surface opposite the plate outer surface, a first plate side wall, and a second plate side wall opposite the first plate side wall. The coupler plate may define a coupler slot extending between one of: (1) the first plate side wall and the second plate side wall, or (2) the plate outer surface and the plate inner surface. The coupler plate may be configured to be received in the ring recess of the lock-ring section.

According to a further aspect, a lock-ring section may be configured to at least partially form an annular lock-ring. The lock-ring section may define a curved longitudinal axis extending along a length of the lock-ring section between a first ring section end and a second ring section end. The lock-ring section may further define a ring cross-section perpendicular to the longitudinal axis. The ring cross-section may include a ring outer surface and a ring inner surface opposite the ring outer surface. One of the ring inner surface or the ring outer surface may define a ring recess configured to at least partially receive a coupler plate. The ring cross-section may further include a first ring side wall and a second ring side wall opposite the first ring side wall. The lock-ring section may include a first ring aperture defined adjacent the first ring section end and extending between one of: (1) the first ring side wall and the second ring side wall, or (2) the ring outer surface and the ring inner surface. The lock-ring section may further include a second ring aperture defined adjacent the second ring section end and extending between one of: (1) the first ring side wall and the second ring side wall, or (2) the ring outer surface and the ring inner surface.

According to another aspect, a coupler plate may be configured to couple a first ring section end of a lock-ring section to one of a second ring section end of the lock-ring section or a ring section end of a second lock-ring section. The coupler plate may include a plate outer surface, a plate inner surface opposite the plate inner surface, a first plate side wall, and a second plate side wall opposite the first plate side wall. The coupler plate may define a coupler slot extending between one of: (1) the first plate side wall and the second plate side wall, or (2) the plate outer surface and the plate inner surface. The coupler plate may be configured to be received in at least one of a first ring recess of the first ring end section or a second ring recess of the one of the second ring section of the lock-ring section or the ring end section of a second lock-ring section.

According to still another aspect, a method for separating opposing lock-ring ends from one another may include loosening a first fastener coupling a first end of a coupler plate to a first opposing lock-ring end, sliding the first end of the coupler plate relative to the first opposing lock-ring end, thereby causing separation of the first opposing lock-ring end from a second opposing lock-ring end, and engaging a handle including a handle body with the coupler plate, such that the coupler plate maintains the separation of the first opposing lock-ring end from the second opposing lock-ring end.

BRIEF DESCRIPTION OF THE DRAWINGS

The detailed description is described with reference to the accompanying figures. In the figures, the same reference numbers in different figures indicate similar or identical items.

FIG. 9A is a schematic partial perspective view of a portion of another example lock-ring showing two of four example fasteners separated from the coupler plate and ring section ends.

FIG. 9B is a schematic partial perspective of the exterior of the example coupler plate and first and second ring section ends shown in FIG. 9A, with the first and second ring section ends separated from one another using two of the example fasteners and the coupler plate.

DETAILED DESCRIPTION

The present disclosure is generally directed to wheel assemblies, lock-rings for wheel assemblies, handles engageable with lock-rings, and related methods. As noted previously herein, it has been found that at least some retaining rings for assisting with retaining a tire on a wheel assembly may be difficult to remove. In addition, some such retaining rings may be relatively large, heavy, and cumbersome for an individual to handle, for example, during removal from the wheel assembly or installation onto the wheel assembly.

In some examples described herein, the lock-ring may include ring section ends configured to be coupled to one another via a coupler plate. The lock-ring and/or coupler plate may be configured, such that one or more fasteners coupling the lock-ring plate and the opposing ring section ends to one another are relatively more protected from damage and/or dirt relative to other configurations. The lock-ring and/or coupler plate may provide a relatively lower profile that may be relatively less prone to catch other portions of the wheel assembly and/or tire relative to other configurations.

In some examples described herein, the lock-ring, coupler plate, and/or handle may facilitate servicing and/or removal of the lock-ring by a single person and/or improved ease of servicing and/or removal by more than one person. The lock-ring and/or coupler plates may reduce and/or eliminate the necessity of separating the coupler plate from the lock-ring when removing the lock-ring from a wheel assembly. In particular, the handle may provide an ability to maintain separation of two opposing ring section ends of a lock-ring. In addition, the coupler plate and/or the handle may provide a place to retain one or more fasteners used to couple opposing ring section ends, for example, to prevent unintentional misplacement of the fasteners while a lock-ring is loosened from around a rim and/or separated from a wheel assembly. The handle may provide relatively safe handling of the lock-ring during loosening and/or separation from the wheel assembly.

Figure 1:
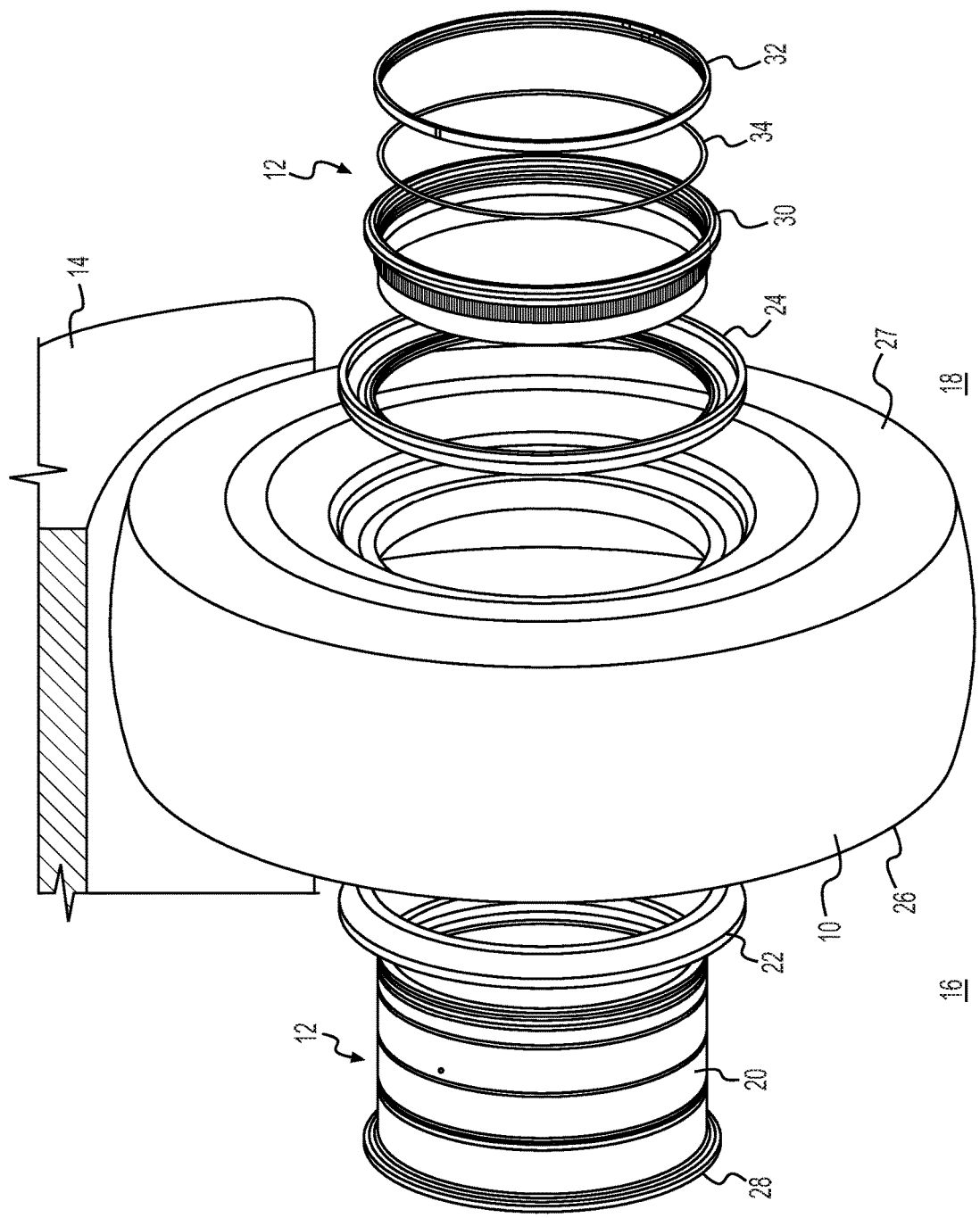
FIG. 1 is a schematic exploded perspective view showing an example tire and wheel assembly for a machine.

FIG. 1 is a schematic exploded perspective view showing an example tire 10 and wheel assembly 12 for a machine 14 with the tire 10 mounted on the wheel assembly 12, which, in turn, may be mounted to the machine 14, for example, to a chassis of the machine 14. The tire 10, the wheel assembly 12, and/or the machine 14 may be intended exclusively for off-road use, for both off-road and on-road use, and/or exclusively for on-road use. For example, the machine 14 may include any type of ground-borne machine or vehicle configured to travel across terrain, such as, for example, a construction machine, a mining machine, a truck, an agricultural vehicle, an automobile, an on-highway truck, an off-highway truck, and/or any other machine known to a person skilled in the art. The tire 10 may be a pneumatic tire, a non-pneumatic tire, and/or a tire at least partially filled with one or more materials other than fluid or gas.

Figure 2:
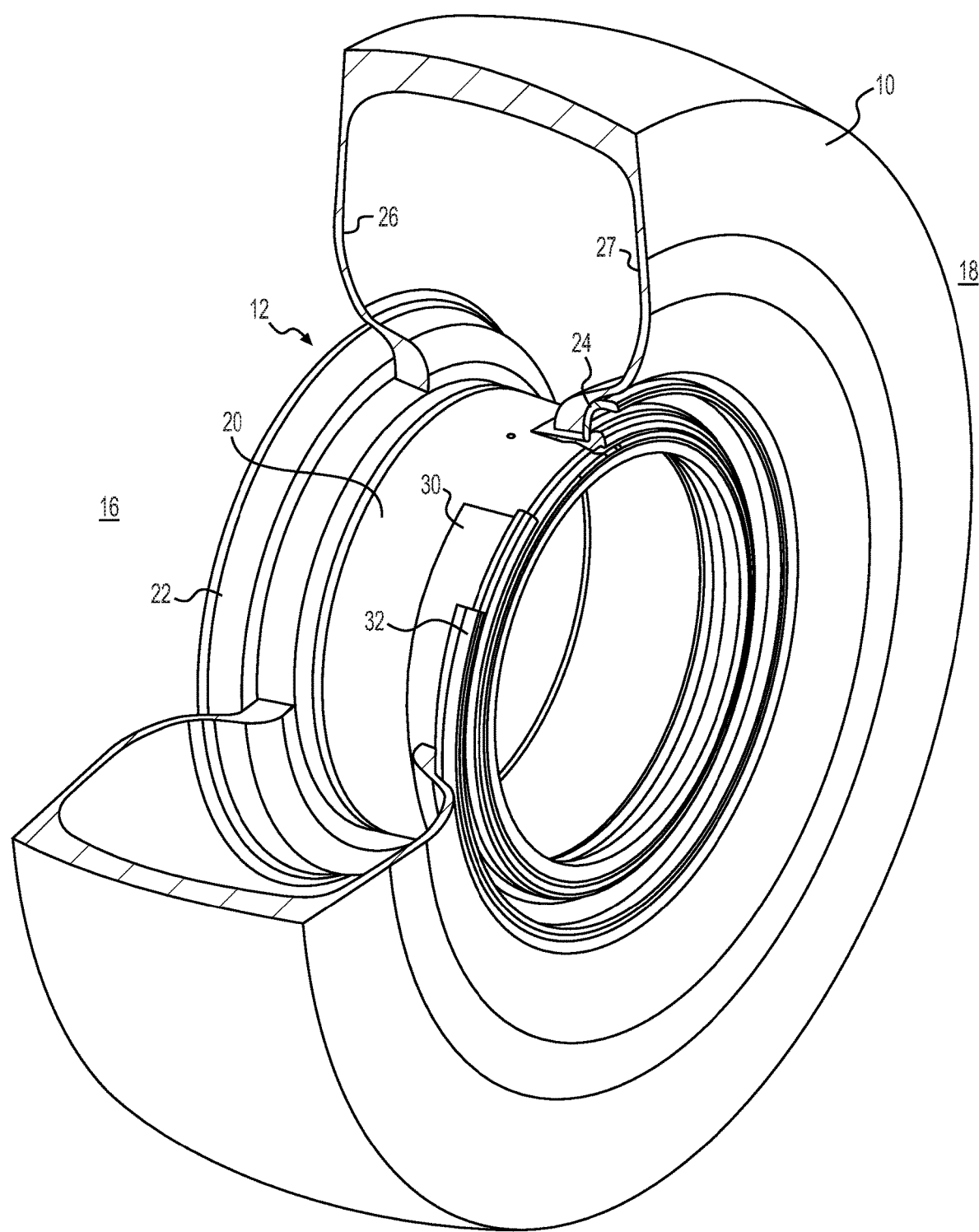
FIG. 2 is a schematic quarter section view of the example tire and wheel assembly shown in FIG. 1.
Figure 3:
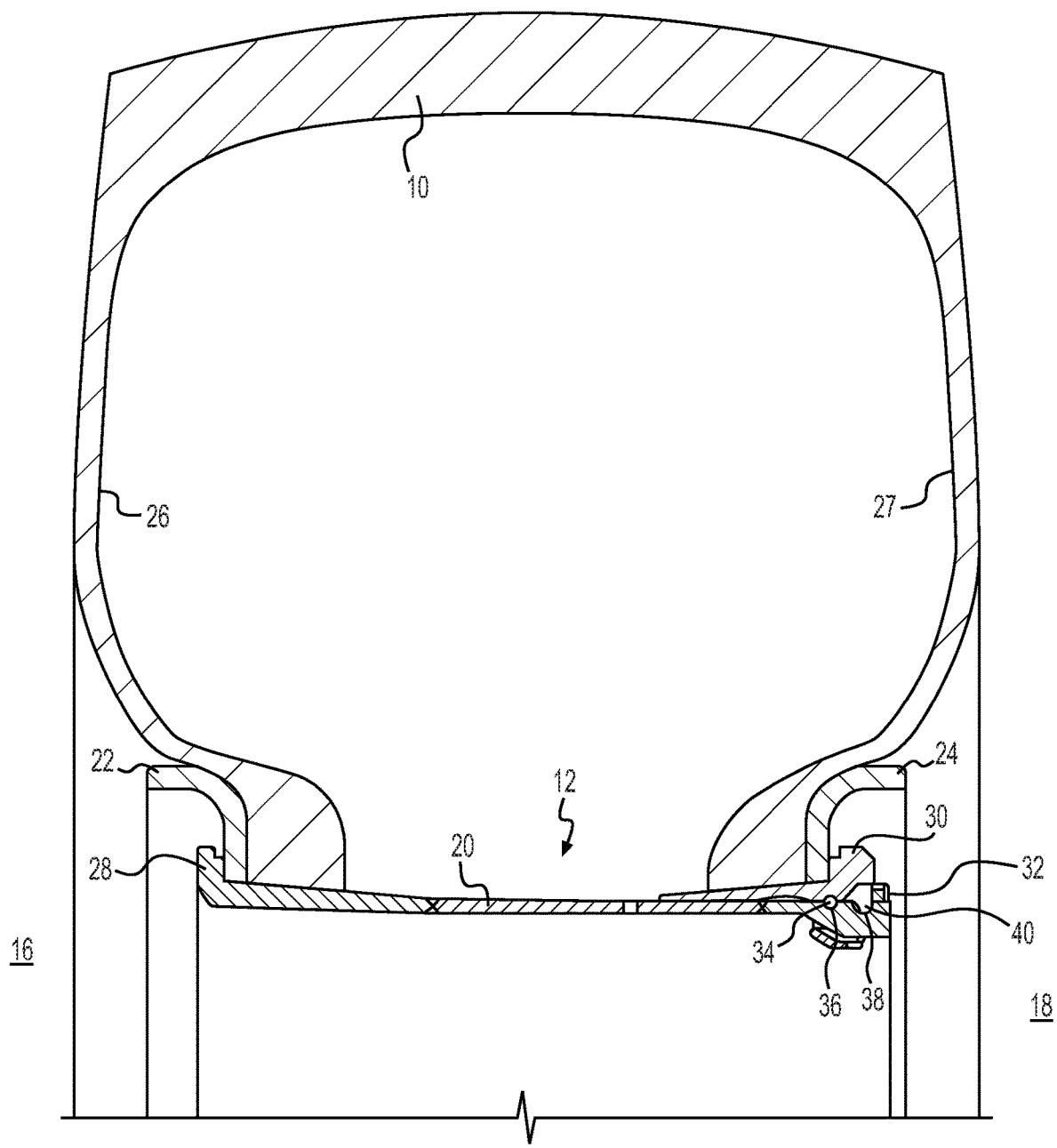
FIG. 3 is a schematic partial section view of an example tire and wheel assembly.

As shown in FIGS. 1, 2, and 3, the example tire 10 and wheel assembly 12 may define an inner side 16 configured to be adjacent a chassis of the machine 14 and/or another tire and wheel assembly located inboard relative to the tire 10 and wheel assembly 12, for example, in a dual-tire/dual-wheel arrangement, and an outer side 18 configured to face outwardly relative to the machine 14 and/or another tire and wheel assembly located outboard relative to tire 10 and wheel assembly 12. In the example shown, the wheel assembly 12 includes a rim base 20 about which an inner circumference of the tire 10 may be mounted. The example wheel assembly 12 also includes an inner side ring 22 and an outer side ring 24 provided on opposite sides of the wheel assembly 12.

FIG. 2 is a schematic quarter section view of the example tire 10 and the example wheel assembly 12 shown in FIG. 1, and FIG. 3 is a schematic partial section view of the tire 10 and wheel assembly 12 shown in FIG. 2. As shown in FIGS. 2 and 3, when the tire 10 is mounted on the wheel assembly 12, an inner side wall 26 and opposing outer side wall 27 of the tire 10 are retained on the rim base 20 between the inner side ring 22 and the outer side ring 24. In some examples, the tire 10 may be a pneumatic tire, and when air and/or another fluid or gas is supplied to the tire 10, pressure inside the tire 10 causes the inner side wall 26 and outer side wall 27 to press against the inner side ring 22 and the outer side ring 24, respectively.

In the example shown, the inner side of the rim base includes an annular bead flange 28 configured to retain the inner side ring 22, such that the inner side ring 22 is retained between the bead flange 28 and the inner side wall 26 of the tire 10. As shown in FIGS. 2 and 3, the example wheel assembly 12 also includes a bead seat band 30 configured to retain the outer side ring 24 against the outer side wall 27 of the tire 10, and a lock ring 32 configured to secure the bead seat band 30 in position on the rim base 20, such that the outer side ring 24 resists outward movement of the outer side wall 27 of the tire 10. As shown in FIGS. 1-3, the wheel assembly 12 may also include an O-ring seal 34 received in complimentary annular grooves 36 in opposing faces of the bead seat band 30 and the lock-ring 32.

During mounting of the example tire 10 on the example wheel assembly 12, in some examples, the lock-ring 32, the bead seat band 30, and the inner side ring 22 are separated from the rim base 20. The inner side ring 22 is slid onto the outer side of the wheel assembly 12, across the rim base 20, and toward the bead flange 28 until the inner side ring 22 abuts the bead flange 28. Thereafter, in some examples, the tire 10 may be slid onto the outer side 18 of the wheel assembly 12, such that the inner circumference of the tire 10 is mounted around the rim base 20 and such that the inner side wall 26 approaches and/or abuts the inner side ring 22. Without pressure in the tire, for example, when the tire 10 is a pneumatic tire, the outer side wall 27 may be pressed toward the inner side wall 26. Thereafter, the outer side ring 24 may be placed around the rim base 20, and the bead seat band 30 may be inserted into the inner circumference of the outer side ring 24, between the outer side ring 24 and the rim base 20. The outer side of the rim base 20 may define an annular rim base groove 38 configured to receive a complimentary protrusion 40 of the lock-ring 32, which, as described herein, may be configured to facilitate positioning of the lock-ring 32, such that the protrusion 40 is received in the rim base groove 38, thereby preventing the tire 10 from being able to slide off the rim base 20 toward the outer side of the wheel assembly 12 without first separating the lock-ring 32 from the rim base 20.

Figure 4:
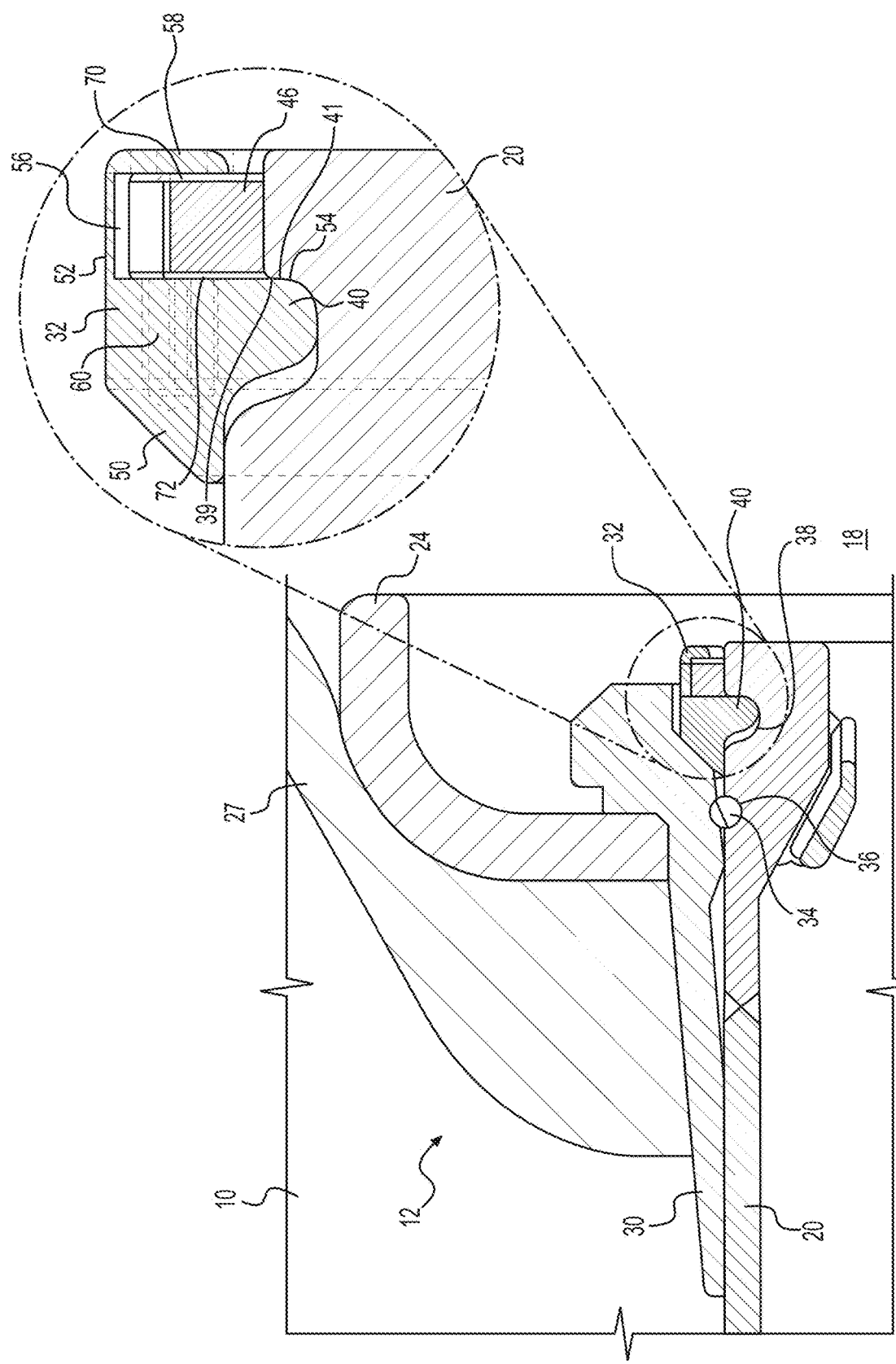
FIG. 4 is a schematic detailed section view of a portion of the example tire and wheel assembly shown in FIG. 3 showing a detailed section view of an example lock-ring section.

For example, FIG. 4 is a schematic detailed section view of a portion of the example tire 10 and wheel assembly 12 shown in FIG. 3 showing a detailed section view of an example lock-ring section 42. As shown in FIG. 4, in some examples, the rim base groove 38 includes a radial groove portion 39, and the protrusion 40 includes a corresponding radial protrusion portion 41. The radial groove portion 39 and the radial protrusion portion 41 provide a contact surface between the rim base groove 38 and the protrusion 40 of the lock-ring 32.

During removal of the tire 10 from the wheel assembly 12, pressure is released from the tire 10 (e.g., if it is a pneumatic tire), and the lock-ring 32 may be separated from the rim base 20, for example, as described herein, facilitating removal of the bead seat band 30 and the outer side ring 24 from the rim base 20. Thereafter, the tire 10 may slide outward across the width of the rim base 20 and be separated from the wheel assembly 12. In some examples, if the tire 10 and wheel assembly 12 are outboard relative to an inboard tire and wheel assembly, the inner side ring 22 may be removed from the rim base 20 by sliding it outward toward the outer side of the rim base 20 and separating it from the rim base 20. Thereafter, in some examples, the tire of the inboard tire and wheel assembly may be separated from the inboard wheel assembly by removing the associated lock-ring, bead seat band, and outer side ring from the inboard rim base, so that the inboard tire can slide off the inboard rim base, across the outboard rim base 20 and be separated from the outboard wheel assembly 12.

Figure 5:
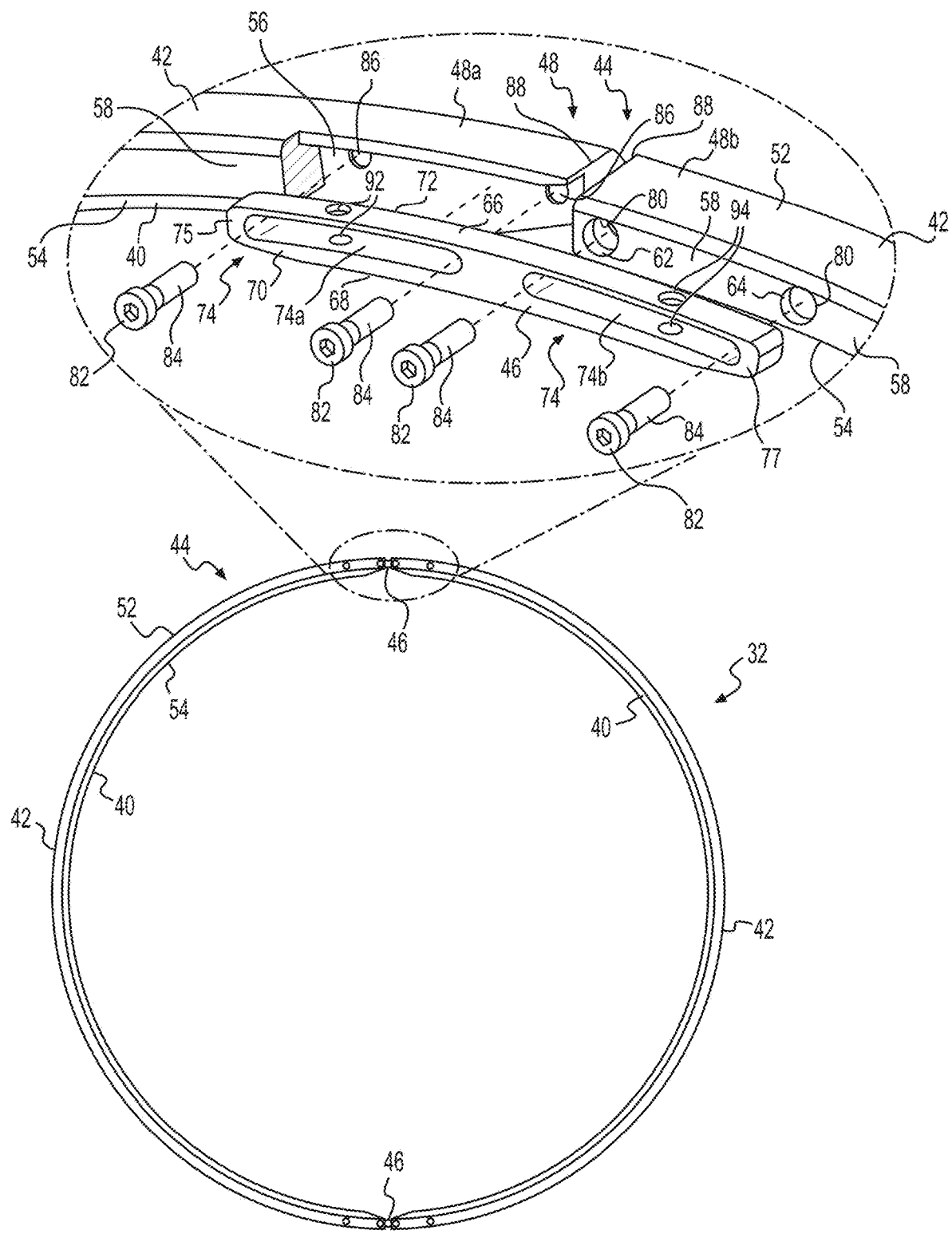
FIG. 5 is a schematic side view of an example lock-ring system including example lock-ring sections and example coupler plates, including a detailed perspective partial section view of the example coupler plate.

FIG. 5 is a schematic side view of an example lock-ring system 44 including two example lock-ring sections 42 and two example coupler plates 46 coupling the two lock-ring sections 42 to one another and including a detailed perspective partial section view of one of the two example coupler plates 46. Other numbers of lock-ring sections 42 and coupler plates 46 are contemplated including, for example, one lock-ring section 42 and one coupler plate 46 coupling opposing ring section ends 48 to one another, and more than two lock-ring sections 42 and more than two coupler plates 46 coupling multiple opposing ring section ends 48 to one another to form a single lock-ring 32.

Referring to FIGS. 4 and 5, the example lock-ring 32 shown includes an example lock-ring system 44. The example lock-ring system 44 shown includes two lock-ring sections 42. One or more of the lock-ring sections 42 may be configured to at least partially define an annular lock-ring 32 and a curved longitudinal axis R extending along a length of the lock-ring section 42 between a first ring section end 48a and a second ring section end 48b. In some examples, one or more of the lock-ring sections 42 may define a ring cross-section 50 perpendicular to the longitudinal axis R. The ring cross-section 50 may include a ring outer surface 52 and a ring inner surface 54 opposite the ring outer surface 52. The ring inner surface 52 or the ring outer surface 54 may define a ring recess 56 configured to at least partially receive the coupler plate 46. In some examples, the ring cross-section 50 may also define a first ring side wall 58 and a second ring side wall 60 opposite the first ring side wall 58.

As shown in FIGS. 4 and 5, the example ring inner surface 54 defines the protrusion 40 configured to engage the rim base groove 38 (see, e.g., FIGS. 2 and 3). For example, the protrusion 40 may extend substantially continuously and/or intermittently along the length of a respective lock-ring section 42. In some examples, the ring recess 56 may be defined between the first ring side wall 58 and the second ring side wall 60. In some examples, the ring recess 56 may be at least partially defined by the ring inner surface 54. In some examples, the ring recess 56 may be substantially enclosed, for example, such that at least a portion of the length of the lock-ring section 42 is substantially tubular.

In FIG. 5, a portion of the first ring end section 48a (i.e., the first ring side wall 58) has been omitted in order to show the interior of the example ring recess 56 of the first ring end section 48a. In some examples, one or more of the lock-ring sections 42 may include a first ring aperture 62 defined adjacent the first ring section end 48a and extending either between the first ring side wall 58 and the second ring side wall 60, or between the ring outer surface 52 and the ring inner surface 54. One or more of the lock-ring sections 42 may also include a second ring aperture 64 defined adjacent the second ring section end 48b and extending between either the first ring side wall 58 and the second ring side wall 60 or between the ring outer surface 52 and the ring inner surface 54.

Figure 6:
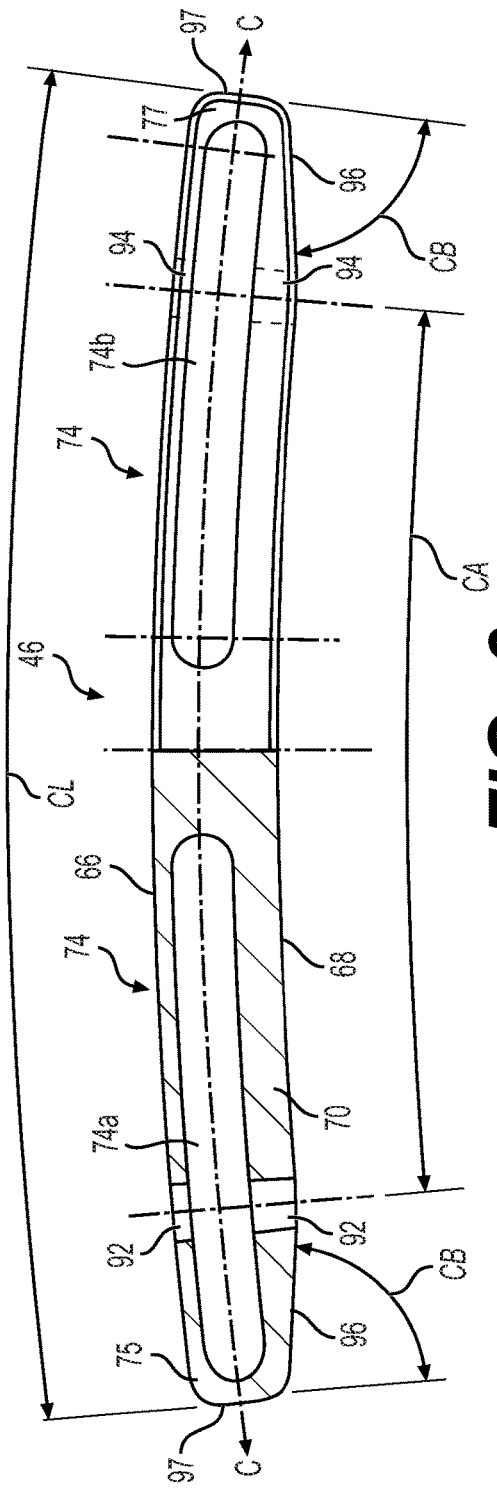
FIG. 6 is a schematic partial side section view of an example coupler plate.

As shown in FIGS. 5 and 6, in some examples, the lock-ring system 44 may also include one or more coupler plates 46 (e.g., two coupler plates 46) configured to couple the first ring section end 48a to the second ring section end 48b or a ring section end 48 of a second lock-ring section 42. As shown in FIGS. 5 and 6, one or more of the coupler plates 46 may include a plate outer surface 66, a plate inner surface 68 opposite the plate outer surface 66, a first plate side wall 70, and a second plate side wall 72 opposite the first plate side wall 70. In some examples, the one or more coupler plates 46 may define a coupler slot 74 extending either between the first plate side wall 70 and the second plate side wall 72, or between the plate outer surface 66 and the plate inner surface 68.

For example, as shown in FIG. 6, the coupler plate 46 may define a curved coupler longitudinal axis C extending along a length of the coupler plate 46 between a first coupler end 75 and a second coupler end 77. In the example shown, the coupler slot 74 extends along the coupler longitudinal axis C. In some examples, the coupler longitudinal axis C has a coupler radius of curvature substantially corresponding to a ring radius of curvature of the curved longitudinal axis R of the lock-ring section(s) 42. In some examples, for example as shown in FIGS. 5 and 6, the coupler plate 46 may define a first coupler slot 74a and a second coupler slot 74b extending either between the first plate side wall 70 and the second plate side wall 72, or between the plate outer surface 66 and the plate inner surface 68. For example, as shown in FIG. 6, the first coupler slot 74a and the second coupler slot 74b extend between the first plate side wall 70 and the second plate side wall 72. In some examples, the coupler plate 46 may be configured to be received in the ring recess 56 of one or more lock-ring sections 42 such that coupler plate 46 is essentially encapsulated within the one or more lock-ring sections 42 and protected from potential damage by or to the external working environment.

Figure 8A:
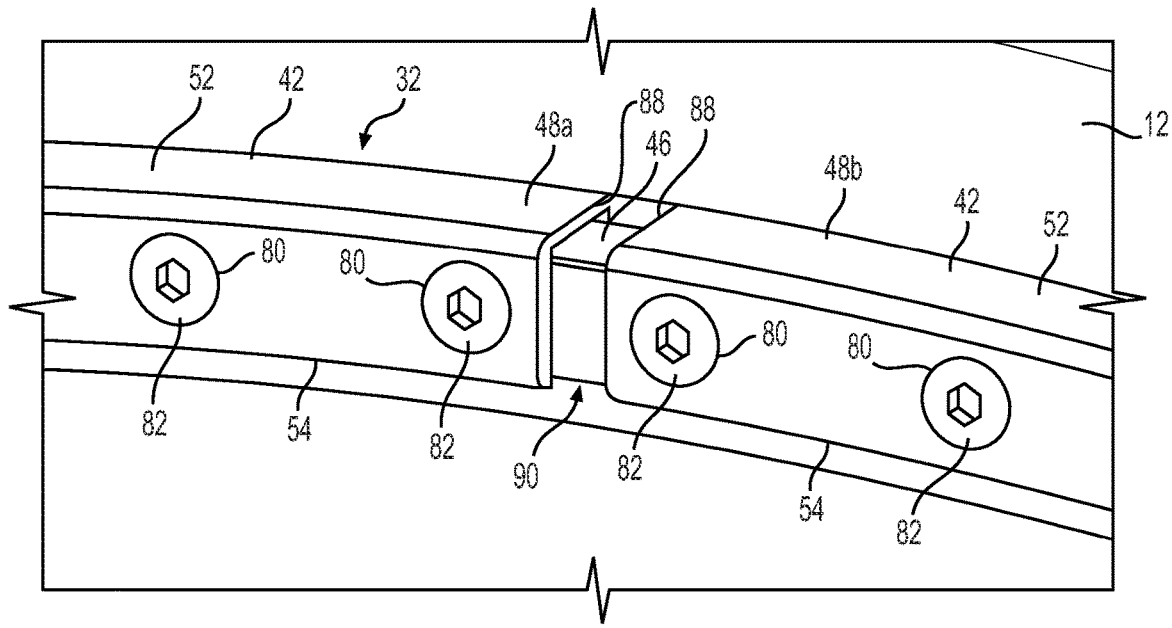
FIG. 8A is a schematic partial perspective view of a portion of an example lock-ring engaged with an example rim, showing from the exterior an example coupler plate coupling an example first ring section end and an example second ring section end to one another using four example fasteners.
Figure 8B:
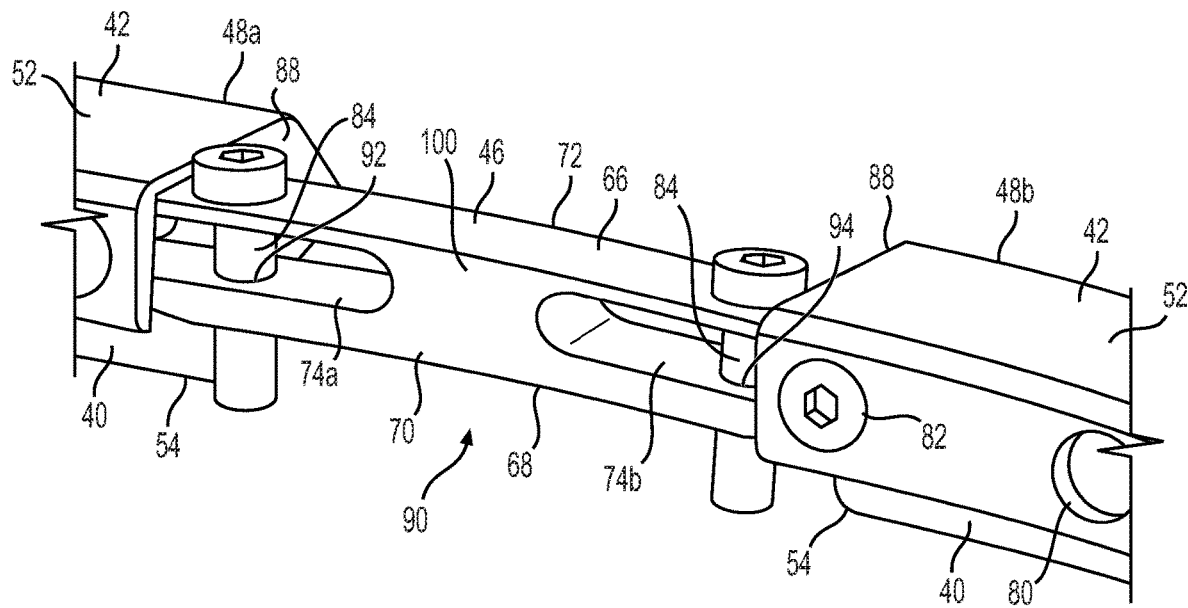
FIG. 8B is a schematic partial perspective view of the exterior of the example coupler plate and first and second ring section ends shown in FIG. 8A, with the first and second ring section ends separated from one another using two of the example fasteners and the coupler plate.

As explained in more detail with respect to FIGS. 6, 8B, and 9B, some examples of the coupler plate 46 may also include first coupler aperture 92 and a second coupler aperture 94, each configured to receive a fastener 84. For example, first and second coupler apertures 92 and 94 may each include a first portion passing through the plate outer surface 66 and a second portion passing through the plate inner surface 68, for example, as shown in FIG. 6. In some examples, the second portions of the first and second coupler apertures 92 and 94 may be internally threaded to engage with threads on the fasteners 84. This example configuration may provide a location for retaining two of the fasteners 84, once removed from the second ring apertures 64 of the ring section ends 48, for example, when the ring section ends 48 are separated from one another to remove the lock-ring 32 from the rim base 20. With the fasteners 84 in the first and second coupler apertures 92 and 94, the fasteners 84 may serve to maintain a spacing between the ring section ends 48a and 48b sufficient to provide clearance for removal of the lock-ring 32 from the rim base 20.

As shown in FIG. 6, the coupler plate 46 may have a length dimension sufficient for the opposing ring section ends 48a and 48b to be separated from one another, for example, with the fasteners 84 remaining in the respective first ring apertures 62 (and not the respective second ring apertures 64), such that the lock-ring 32 may be removed from the rim base 20. For example, the ring section ends 48a and 48b may be separated enough that the protrusions 40 of the lock-ring sections 42 clear the rim base groove 38 of the rim base 20. In addition, in some examples, the coupler slots 74a and 74b may be dimensioned and positioned in the coupler plate 46 to provide the sufficient amount of separation between the first and second ring section ends 48a and 48b while two fasteners 84 remain in the respective first ring apertures 62.

As shown in FIG. 5, in some examples, the lock-ring 32 may include two lock-ring sections 42 coupled to one another by two coupler plates 46. In such examples, the fasteners 84 in the respective second ring apertures 64 may be removed, and the fasteners 84 in the first ring apertures 62 may be loosened to permit the respective first and second ring section ends 48a and 48b to slide outward relative to the coupler plate 46 as the fasteners 84 in the first ring apertures 62 slide down the respective coupler slots 74a and 74b, thereby separating the first and second ring section ends 48a and 48b from one another (see, e.g., FIGS. 8A, 8B, 9A, and 9B). The fasteners 84 received in the second ring apertures 64 may be placed in the first and second coupler apertures 92 and 94, for example, as explained above, so that the separation between the first and second ring section ends 48a and 48b is maintained during handling of the lock-ring 32 (see, e.g., FIGS. 8B and 9B).

As shown in FIG. 6, the example coupler plate 46 may be configured to have a length extending from the first coupler end 75 to the second coupler end 77 so that the opposing ring section ends 48a and 48b are capable of being separated from one another an amount sufficient to remove the lock-ring 32 from the rim base 20, for example, without removing the coupler plate 46 from the ring recesses 56 of the opposing ring section ends 48a and 48b. For example, the coupler plate 46 may have a length corresponding to a portion of the circumference of the lock-ring 32, which may be expressed as, for example, a radial angle CL having a vertex at the center of the lock-ring 32. For example, for a lock-ring 32 for a wheel assembly 12 having a 57-inch diameter, the angle CL may be about 15 degrees, although other angles are contemplated and may depend on, for example, the diameter of the wheel assembly 12. In some examples, the angle CL may range from about 10 degrees to about 20 degrees, from about 11 degrees to about 19 degrees, from about 12 degrees to about 17 degrees, from about 13 degrees to about 17 degrees, from about 14 degrees to about 17 degrees, or from about 15 degrees to about 17 degrees.

Figure 7B:
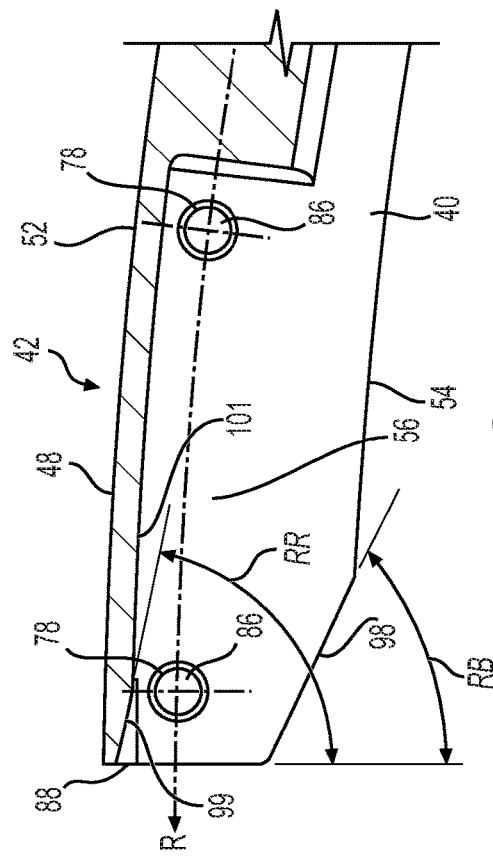
FIG. 7B is a schematic partial side section view of the example ring section end shown in FIG. 7A showing an example ring recess configured to at least partially receive a coupler plate.
Figure 7A:
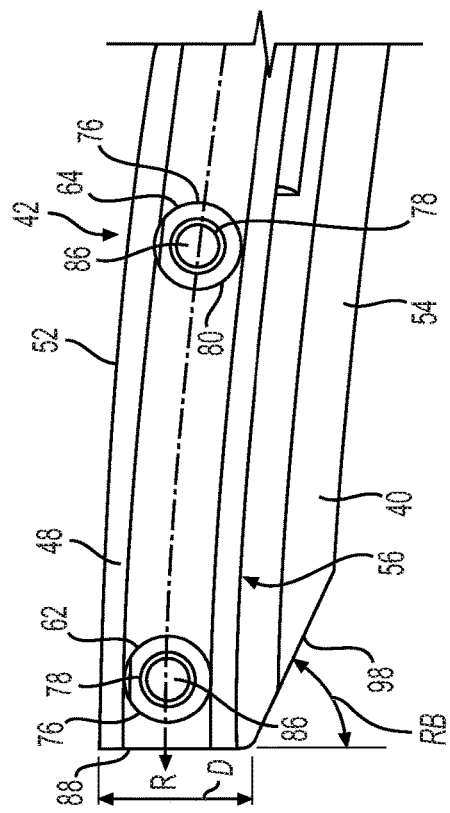
FIG. 7A is a schematic partial side view of an example ring section end.

FIGS. 7A and 7B are a schematic partial side view and a partial side section view of an example ring section end 48. In the example shown, the ring section end 48 includes a first ring aperture 62 and a second ring aperture 64 extending between the first ring side wall 58 and the second ring side wall 60. In some examples, the first ring aperture 62 may include a first aperture section 76 extending through either the first ring side wall 58 or the ring outer surface 52 (e.g., through the first ring side wall 58, as shown). In some examples, the first ring aperture 62 may also include a second aperture section 78 extending into either the second ring side wall 60 or the ring inner surface 54 (e.g., through the second ring side wall 60, as shown). In some examples, the first aperture section 76 defines a first hole 80 configured to receive a head portion 82 of a fastener 84 (e.g., a cap portion of a cap screw, see, e.g., FIG. 5, or a rolled pin 132, see, e.g., FIG. 14), and the second aperture section 78 defines a second hole 86 defining an internal thread configured to engage threads of the fastener 84. As shown in FIGS. 5, 6A, and 6B and described above, some examples of the ring section ends 48 may include two or more ring apertures, for example, each having at least similar aperture sections.

As shown in FIG. 5, a coupler plate 46 may be received in respective ring recesses 56 of opposing ring section ends 48. The fasteners 84 may pass through the first aperture sections 76 of the ring section ends 48, through the coupler slots 74, and into the second apertures sections 78, and, if threaded, tightened to secure the ring section ends 48 and the coupler plate 46 to one another. Opposing end faces of the opposing ring section ends 48 would be closely adjacent one another, for example, such that a resulting lock-ring 32 is secured tightly around the rim base 20 with the protrusion 40 of the lock-ring 32 received in the annular rim base groove 38 (see, e.g., FIGS. 3 and 4).

FIG. 8A is a schematic partial perspective view of an example lock-ring 32 engaged with an example rim base 20, showing from the exterior an example coupler plate 46 coupling an example first ring section end 48a and an example second ring section end 48b to one another using four example fasteners 84. As shown, in some examples, the head portions 82 of the fasteners 84 may be received in the respective holes 80, such that the head portions 82 do not protrude relative to the first plate side wall 70 such that fasteners 84 are protected from potential damage from the external working environment. This example configuration may prevent the area of the lock-ring 32 in the vicinity of the coupler plate 46 from unintentionally catching on the tire 10, other portions of the wheel assembly 12, and/or on clothing, hands, or gloves of a person handling the lock-ring 32.

FIG. 8B is a schematic partial perspective of the exterior of the example coupler plate 46 and first and second ring section ends 48a and 48b shown in FIG. 8A, with the first and second ring section ends 48a and 48b separated from one another. FIGS. 9A and 9B are schematic partial perspective views of another example lock-ring 32, showing two of four example fasteners 84 separated from the coupler plate 46 and ring section ends 48a and 48b (FIG. 9A), and with the first and second ring section ends 48a and 48b separated from one another and being held in place using the two removed fasteners 84 and the coupler plate 46. For example, to loosen the lock-ring 32 and separate it from the rim base 20, the fasteners 84 may be loosened, so that the coupler plate 46 is able to slide within one or more of the ring recesses 56 of the first and second ring section ends 48a and 48b. The two fasteners 84 located farthest from remote ends 88 of the first and second ring section ends 48a and 48b may be removed from the second ring apertures 64, so that a separation 90 between the remote ends 88 may be increased to an amount sufficient to permit the lock-ring 32 to be slid off the rim base 20 and be separated therefrom.

In some examples, the two removed fasteners 84 may be used to maintain the separation 90, for example, as shown in FIGS. 8B, 9A, and 9B. For example, as shown in FIGS. 5 and 6, the coupler plate 46 may include a first coupler aperture 92 extending perpendicular to the first coupler slot 74a and configured to receive a first one of the fasteners 84. The first coupler aperture 92 may extend either between the first plate side wall 70 and the second plate side wall 72, or between the plate outer surface 66 and the plate inner surface 68. In addition, some examples of the coupler plate 46 may also include a second coupler aperture 94 extending perpendicular to the second coupler slot 74b and configured to receive a second one of the fasteners 84. The second coupler aperture 94 may extend either between the first plate side wall 70 and the second plate side wall 72, or between the plate outer surface 66 and the plate inner surface 68.

In the example shown in FIGS. 6, 8B, 9A, and 9B, the first and second coupler apertures 92 and 94 extend between the plate outer surface 66 and the plate inner surface 68. As shown in FIGS. 8B, 9A, and 9B, as explained above, the two removed fasteners 84 may be used to maintain the separation 90 between the remote ends 88 of the lock-ring sections 42 at an amount sufficient to permit the lock-ring 32 to slide off the rim base 20 and be separated therefrom.

Referring again to FIG. 6, the distance between the first coupler aperture 92 and the second coupler aperture 94 may be configured such that when the respective fasteners 84 are received in the first and second coupler apertures 92 and 94, the distance between the respective fasteners 84 is sufficient for the opposing ring section ends 48a and 48b of the lock-ring 32 to be separated from one another an amount sufficient to remove the lock-ring 32 from the rim base 20, for example, without removing the coupler plate 46 from the ring recesses 56. For example, the distance between the first and second coupler apertures correspond to a portion of the circumference of the lock-ring 32, which may be expressed as, for example, a radial angle CA having a vertex at the center of the lock-ring 32. For example, for a lock-ring 32 for a wheel assembly 12 having a 57-inch diameter, the angle CA may be about 10 degrees, although other angles are contemplated and may depend on, for example, the diameter of the wheel assembly 12. In some examples, the angle CA may range from about 7 degrees to about 13 degrees, from about 8 degrees to about 12 degrees, or from about 9 degrees to about 11 degrees.

As shown in FIG. 6, in some examples, the plate inner surface 68 of the coupler plate 46 may include a beveled end 96 at one or more of the first and second coupler ends 75 and 77 of some examples of the coupler plate 46. The beveled end(s) 96 may provide clearance for the coupler plate 46 to be received in the ring recesses 56 of opposing ring section ends 48, and/or to allow the opposing ring section ends 48a and 48b to be separated from one another as described herein without separating the coupler plate 46 from the ring recesses 56. For example, the beveled ends 96 of the coupler plate 46 may have an angle CB measured relative to an end face 97 of the coupler plate 46 parallel to a radial line extending through the center of the lock-ring 32. For example, for a lock-ring 32 for a wheel assembly 12 having a 57-inch diameter, the angle CB may be about 80 degrees, although other angles are contemplated and may depend on, for example, the diameter of the wheel assembly 12. In some examples, the angle CB may range from about 70 degrees to about 85 degrees, from about 77 degrees to about 83 degrees, from about 78 degrees to about 82 degrees, or from about 79 degrees to about 81 degrees.

In some examples, for example, as shown in FIGS. 7A, 7B, 9A and 9B, the ring inner surface 54 of one or more of the ring section ends 48a or 48b may include a beveled end 98. In some examples, this may provide clearance for the lock-ring sections 42 to slide relative to the rim base 20 while still being held together by the coupler plate 46, for example, as shown FIGS. 9A and 9B. For example, the beveled ends 98 of the ring section ends 48 may have an angle RB measured relative to a respective face corresponding to the remote end 88 of the ring section end 48 that is parallel to a radial line extending through the center of the lock-ring 32. For example, for a lock-ring 32 for a wheel assembly 12 having a 57-inch diameter, the angle RB may be about 65 degrees, although other angles are contemplated and may depend on, for example, the diameter of the wheel assembly 12. In some examples, the angle RB may range from about 55 degrees to about 75 degrees, from about 60 degrees to about 70 degrees, or from about 65 degrees to about 70 degrees. In some examples, as shown in FIG. 7A, the leading edge of the beveled end 98 may begin a distance D from the ring outer surface 52, such that clearance is provided for the lock-ring sections 42 to slide relative to the rim base 20 while still held together by the coupler plate 46. In other examples, the distance D may extend farther to increase the contact area between protrusion 40 of the lock-ring 32 and rim base groove 38. For example, for a lock-ring 32 for a wheel assembly 12 having a 57-inch diameter, the distance D may be about 38 millimeters (mm), although other dimensions are contemplated and may depend on, for example, the diameter of the wheel assembly 12. In some examples, the distance D may range from about 30 mm to about 45 mm, from about 33 mm to about 43 mm, or from about 35 mm to about 40 mm.

In some examples, the beveled end 98 may be configured, such that at least a portion of the radial protrusion portion 41 of the protrusion 40 maintains a contact surface with the radial groove portion 39 of the rim base groove 38 (see, e.g., FIG. 4) substantially the entire circumference of the lock-ring 32, for example, even where the beveled end 98 is provided at each of the ring section ends 48a and 48b.

As shown in FIG. 7B, some examples of the ring section end 48 may include a beveled edge 99 at a radially inward facing surface 101 of the ring recess 56 adjacent the remote end 88 of the ring section end 88. In some examples, this may facilitate angular movement of the coupler plate 46 with respect to the respective ring recesses 56 of the opposing ring section ends 48a and 48b, for example, during assembly of the coupler plate 46 to the ring section ends 48a and 48b, and/or during separation of the ring section ends 48a and 48b from one another, for example, as explained herein. For example, the beveled edge 99 may have an angle RR measured relative to a respective face corresponding to the remote end 88 of the ring section end 48 that is parallel to a radial line extending through the center of the lock-ring 32. For example, for a lock-ring 32 for a wheel assembly 12 having a 57-inch diameter, the angle RR may be about 75 degrees, although other angles are contemplated and may depend on, for example, the diameter of the wheel assembly 12. In some examples, the angle RR may range from about 65 degrees to about 85 degrees, from about 70 degrees to about 80 degrees, or from about 72 degrees to about 78 degrees.

In some examples, for example, as shown in FIGS. 7A, 7B, 9A and 9B, the coupler plate 46 also includes a web 100 between the first coupler slot 74a and the second coupler slot 74b, for example, separating the first and second coupler slots 74a and 74b from one another.

FIGS. 10A, 10B, 10C, 10D, and 10E show an example sequence of views depicting an example method for separating opposing ring section ends 48 from one another and an example handle 102 for assisting with the separation. As shown in FIGS. 10A through 10E, the example handle 102 includes a handle body 104 extending between a first end 106 and a second end 108. The example handle 102 also includes a first engagement fixture 110 adjacent the first end 106 and a second engagement fixture 112 adjacent the second end 108. The first and second engagement fixtures 110 and 112 may be configured to engage at least a portion of a coupler plate 46 and/or opposing ring section ends 48 of the lock-ring 32. The example handle 102 also includes a grip portion 114 coupled to the handle body 104 and configured to facilitate holding the handle 102. In some examples, the grip portion 114 may have a surface configured to enhance a person's grip on the handle 102. In some examples, the handle 102 may include more than one grip portion 114, such as, for example, two or three grip portions 114 as discussed below with respect to FIGS. 13 and 14. Some such examples may improve the ease of handling the lock-ring 32 and/or lock-ring sections 42.

In the example shown, in at least some examples, at least one of the first engagement fixture 110 or the second engagement fixture 112 may include a slot 116 configured to engage a coupler plate 46 configured to couple opposing ring section ends 48a and 48b to one another. For example, as shown in FIGS. 10A through 10E, each of the first engagement fixture 110 and the second engagement fixture 112 include a slot 116a and 116b, respectively. For example, the slots 116a and 116b may be configured to engage the first and second coupler slots 74a and 74b, respectively, of the coupler plate 46. In some examples, for example as shown, the first engagement fixture 110 includes a first slot 116a defining a first open end 118a facing a first direction, and the second engagement fixture 112 includes a second slot 116b defining a second open end 118b facing a second direction. In the example shown, the first direction and the second direction are opposite one another. In some examples, the first and second directions may be substantially the same or oblique with respect to one another.

Figure 10A:
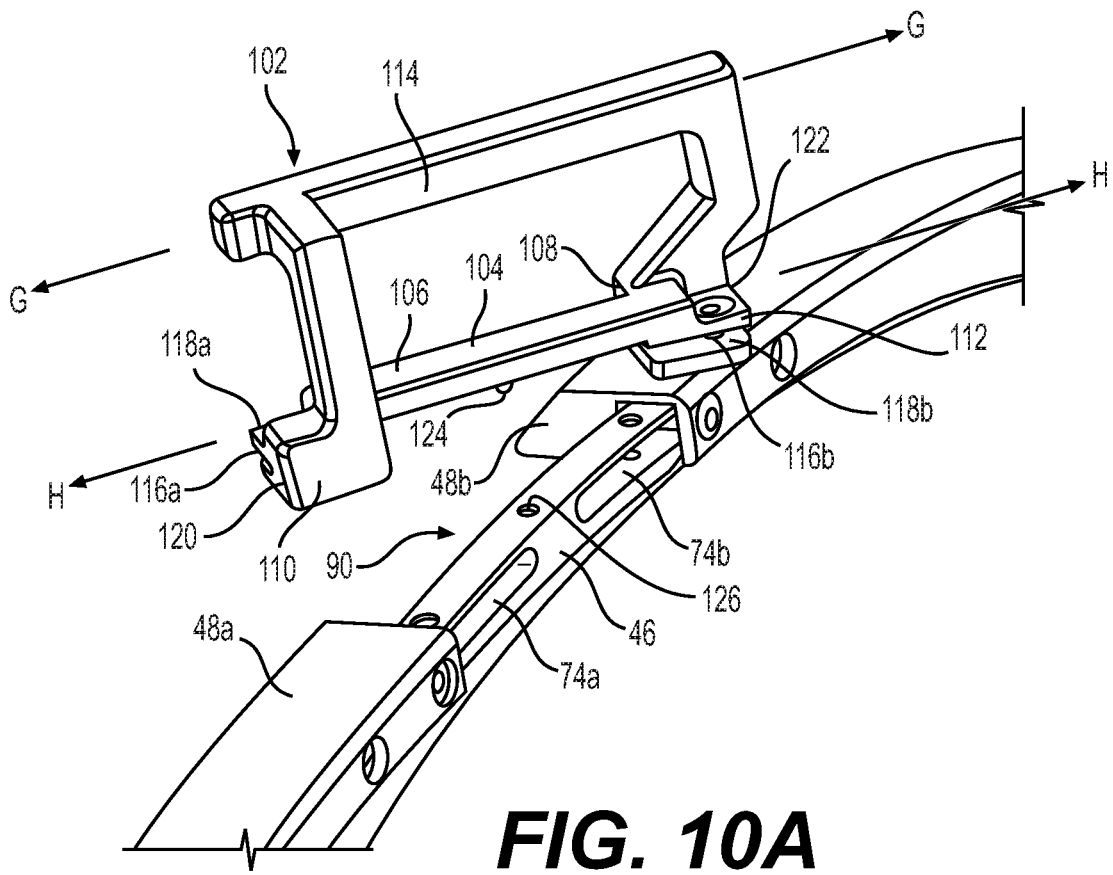
FIG. 10A is a schematic perspective view of an example handle for maintaining separation of opposing ring section ends prior to engagement with the opposing ring section ends.
Figure 10B:
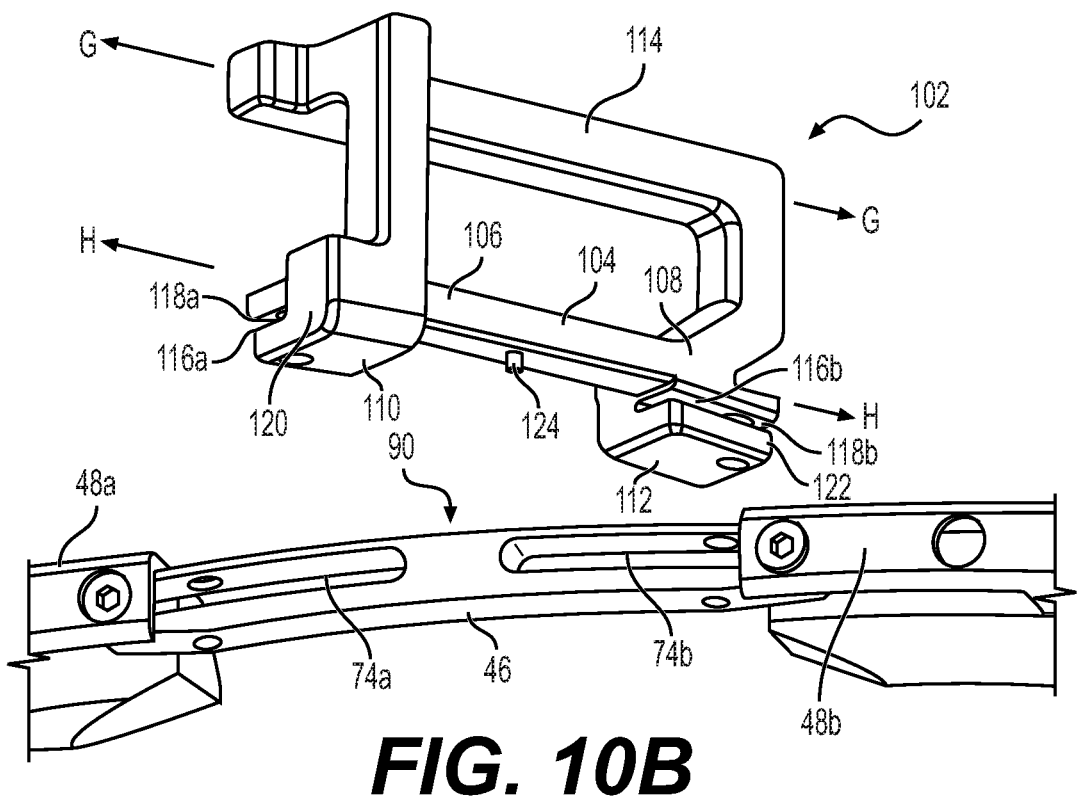
FIG. 10B is a schematic perspective view of the example handle shown in FIG. 10A from a different perspective.
Figure 10C:
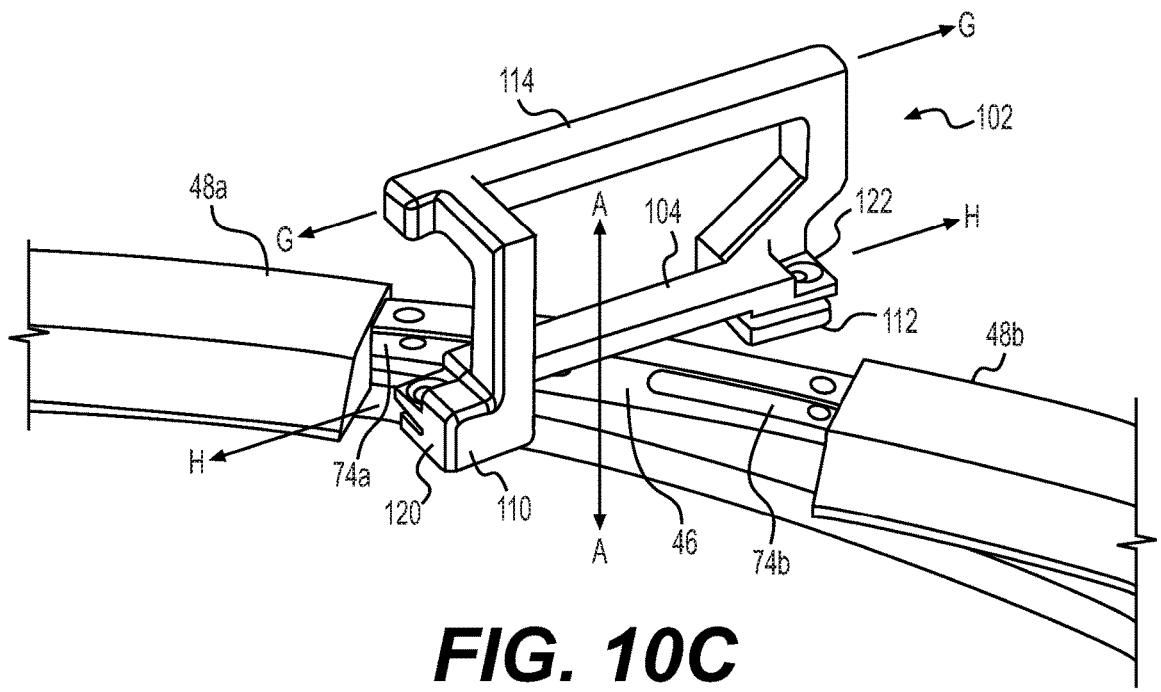
FIG. 10C is a schematic perspective view of the example handle shown in FIGS. 10A and 10B with a portion of the example handle engaging an example coupler plate.
Figure 10D:
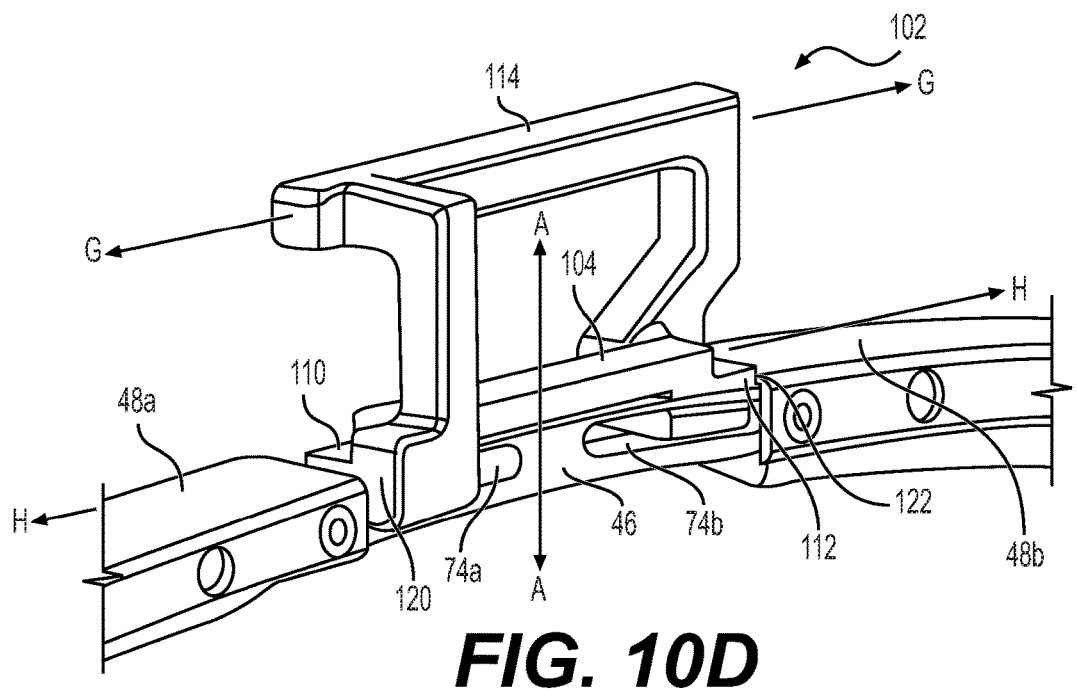
FIG. 10D is a schematic perspective view of the example handle shown in FIGS. 10A-10C, with example first and second engagement fixtures of the handle engaged with the example coupler plate.
Figure 10E:
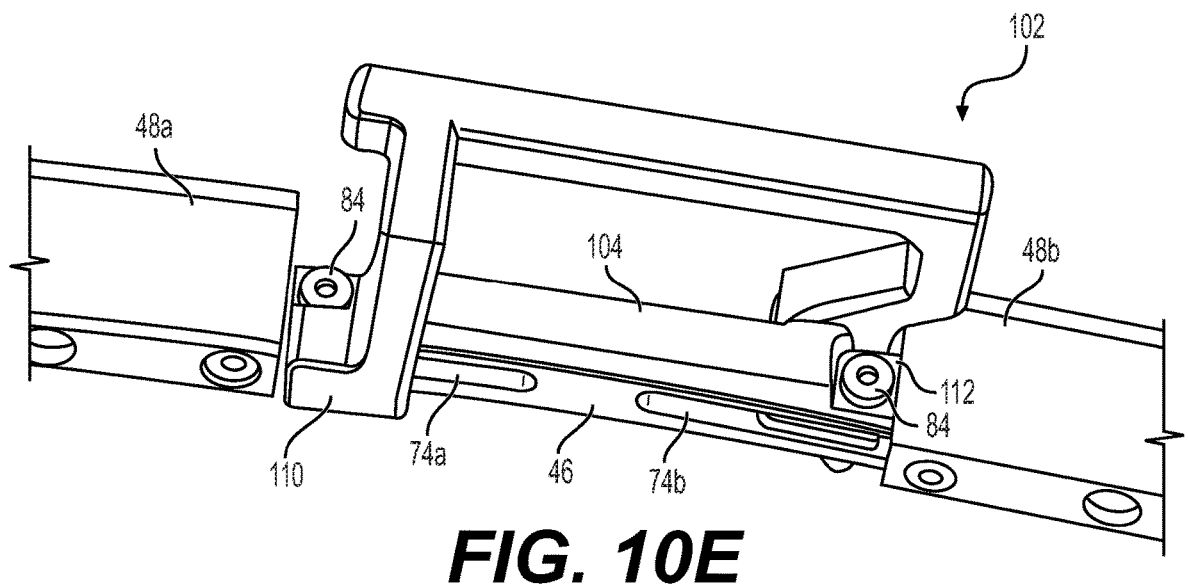
FIG. 10E is a schematic perspective view of the example handle shown in FIGS. 10A-10D, with the first and second engagement fixtures of the handle engaged with the coupler plate and example fasteners coupling the handle to the coupler plate, such that example opposing ring section ends of a lock-ring are maintained separated from one another.

As shown in FIGS. 10A through 10E, for some examples of the handle 102, the first end 106 may define a first stop portion 120, and the second end 108 may define a second stop portion 122. The first stop portion 120 and the second stop portion 122 may be configured to substantially maintain spacing or the separation 90 between the opposing ring section ends 48a and 48b, once the handle 102 is engaged with the coupler plate 46 and/or the opposing ring section ends 48a and 48b, for example, as shown in FIGS. 10D and 10E. As shown in FIGS. 10A and 10B, some examples of the handle 102 may include a pin 124 coupled to the handle body 104 and configured to engage a hole 126 in the plate outer surface 66 of the coupler plate 46. For example, the pin 124 may be located on a side of the handle body 104 configured to abut the plate outer surface 66 of the coupler plate 46. As described herein, the pin 124 and hole 126 may assist with engaging the first and second engagement fixtures 110 and 112 of the handle 102 with the coupler plate 46.

Figure 11:
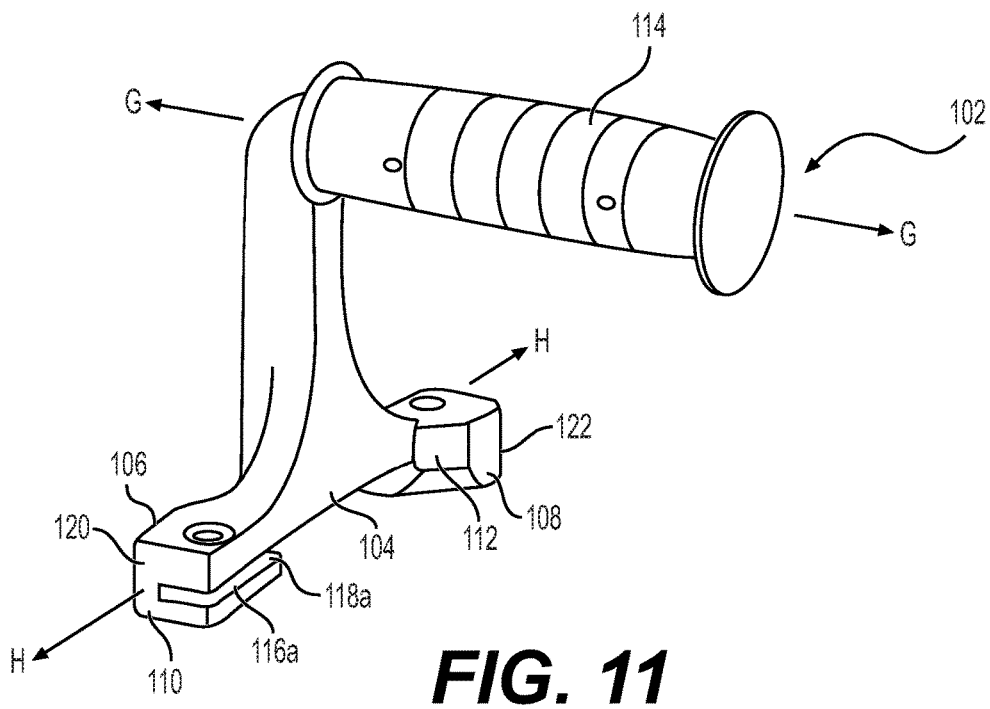
FIG. 11 is a schematic perspective view of another example handle.
Figure 12A:
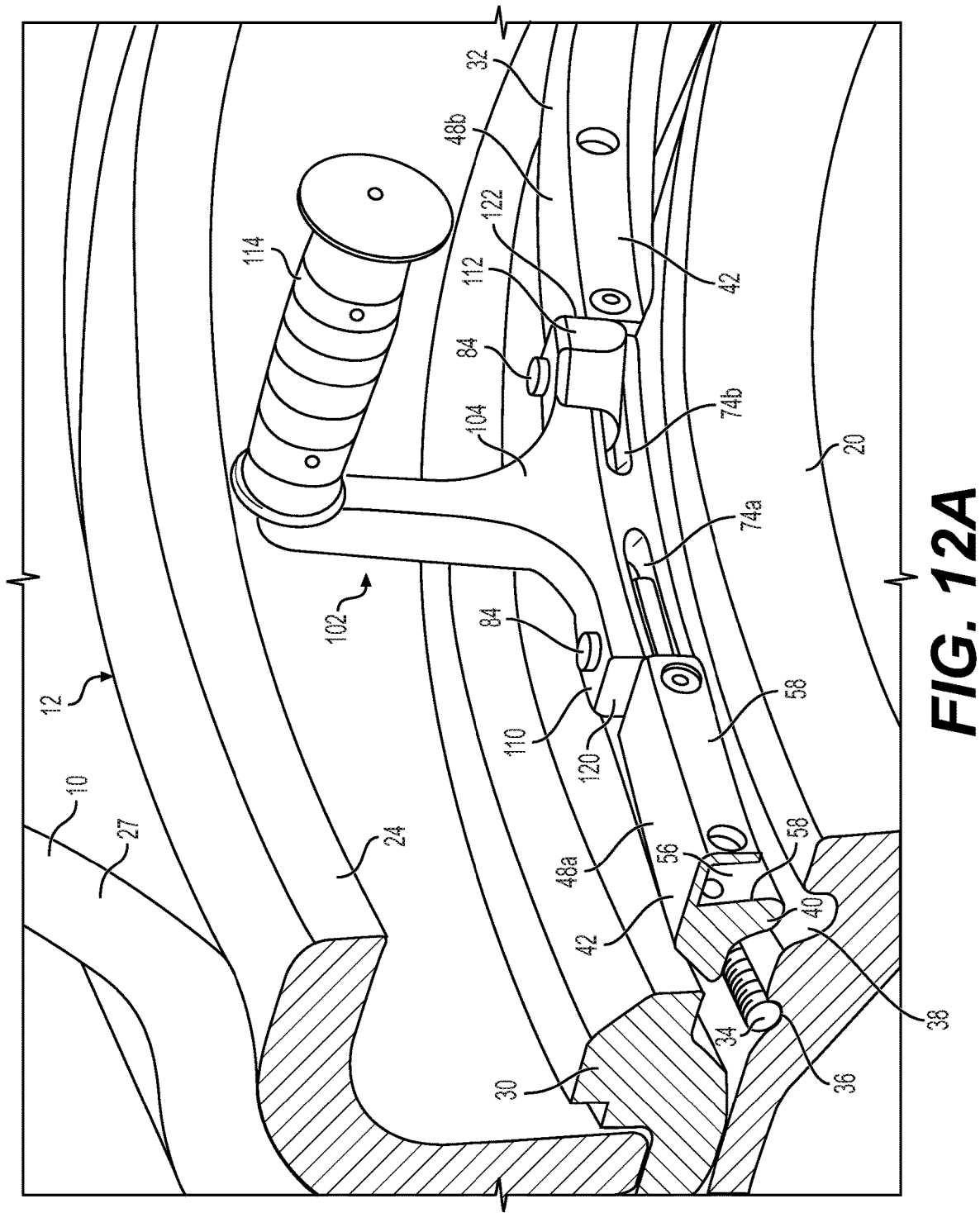
FIG. 12A is a schematic partial perspective view of the example handle shown in FIG. 11 with example first and second engagement fixtures of the handle engaged with example opposing ring section ends of an example lock-ring coupled to an example rim of an example wheel assembly.
Figure 12B:
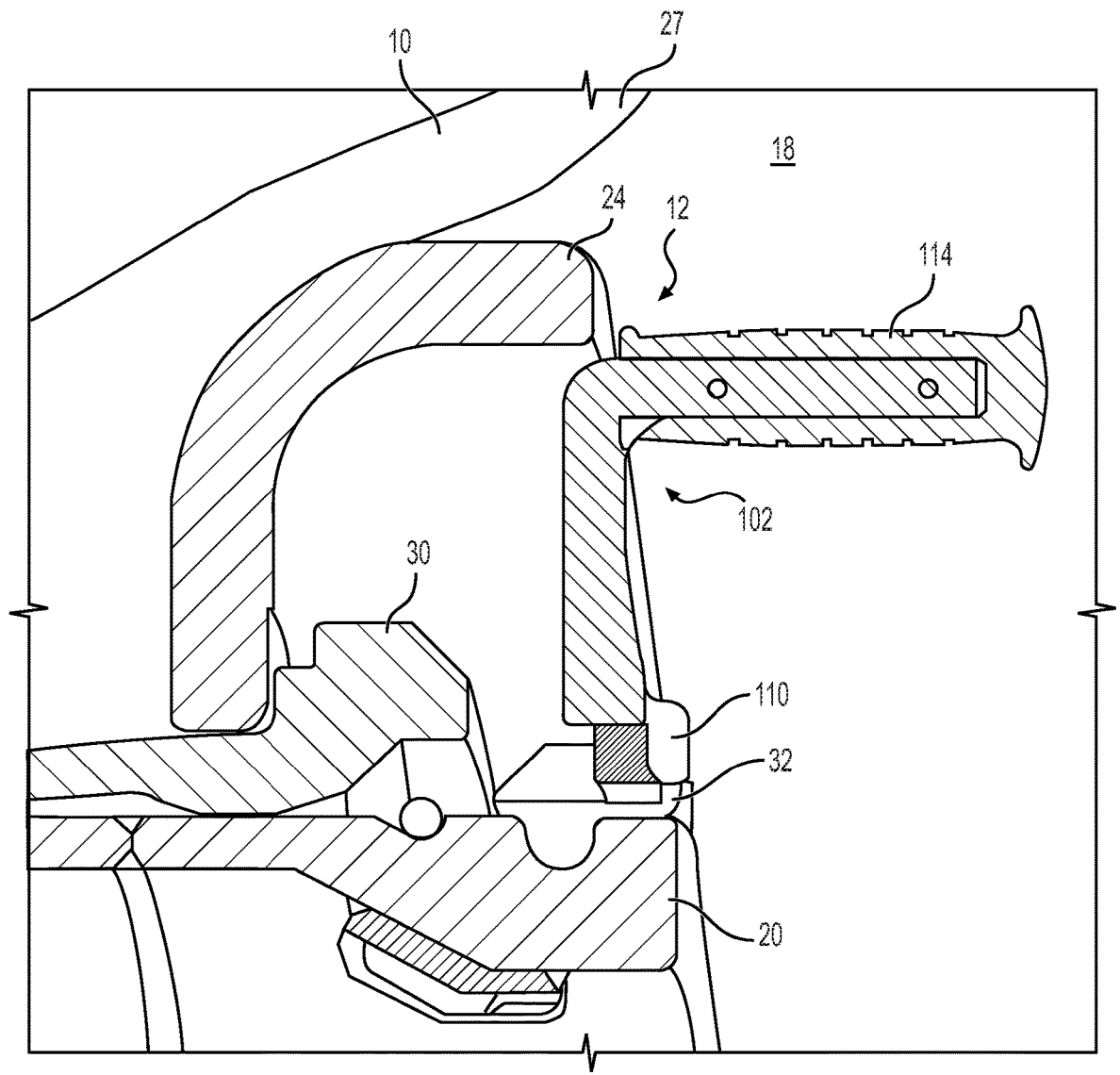
FIG. 12B is a schematic side section view of the example handle shown in FIG. 12A engaged with the example ring section ends.

As shown in FIGS. 10A through 10E, the handle body 104 defines a handle body axis H and the grip portion 114 defines a grip axis G. In some examples of the handle 102, the handle body axis H and the grip axis G are substantially parallel with respect to one another, for example, as shown in FIGS. 10A through 10E. In some examples, the handle body axis H and the grip axis G are substantially orthogonal with respect to one another, for example, as shown in FIGS. 11, 12A, and 12B. In some examples, the handle body axis H and the grip axis G are oblique with respect to one another. The relative orientations of the handle body axis H and the grip axis G may be selected in order to provide ease of handling the lock-ring 32 and/or lock-ring sections 42, for example, during servicing of the wheel assembly 12. For examples including more than one grip portion 114, one or more of the respective the grip axes G may be any combination of substantially orthogonal, substantially parallel, and oblique with respect to the handle body axis H. The relative orientations may be selected to enhance ease of handling the lock-ring 32 and/or the lock-ring sections 42.

As noted above, FIGS. 10A through 10E show an example sequence of views depicting an example method for separating opposing ring section ends 48a and 48b from one another and an example handle 102 for assisting with the separation. For example, the method may include loosening a first fastener 84 coupling the first coupler end 75 of the coupler plate 46 to a first opposing ring section end 48a, and sliding the first coupler end 75 of the coupler plate 46 relative to the first opposing ring section end 48a, thereby causing separation of the first opposing ring section end 48a from the second opposing ring section end 48b.

In some examples, two or more fasteners 84 coupling the coupler plate 46 to the first opposing ring section end 48a may be loosened, depending on the number of fasteners 84 securing the coupler plate 46 to the first opposing ring section end 48a. In some examples, the method may also include loosening a second fastener 84 coupling the second coupler end 77 of the coupler plate 46 to the second opposing ring section end 48b. Thereafter, the method may include sliding the second coupler end 77 of the coupler plate 46 relative to the second opposing ring section end 48b, thereby increasing the separation 90 of the first opposing ring section end 48a from the second opposing ring section end 48b. In some examples, two or more fasteners 84 coupling the coupler plate 46 to the second opposing ring section end 48b may be loosened, depending on the number of fasteners 84 securing the coupler plate 46 to the second opposing ring section end 48b.

In some examples, the method may further include engaging the handle 102 with the coupler plate 46, such that the handle 102 (e.g., the handle body 104) maintains the separation 90 of the first opposing ring section end 48a from the second opposing ring section end 48b, for example, as shown in FIGS. 10A through 10D. Engaging the handle 102 with the coupler plate 46 may include engaging the first end 106 of the handle body 104 with a first portion of the coupler plate 46 and engaging the second end 108 of the handle body 104 with a second portion of the coupler plate 46. For example, the first engagement fixture 110 may be engaged with the first coupler slot 74a, and the second engagement fixture 112 may be engaged with the second coupler slot 74b. As noted above, some examples of the handle body 104 define a first stop portion 120 and a second stop portion 122, and engaging the handle 102 with the coupler plate 46 may include engaging the handle 102, such that the first stop portion 120 and the second stop portion 122 are configured to substantially maintain the separation 90 between the first opposing ring section end 48a and the second opposing ring section end 48b.

As shown in FIGS. 10C and 10D, some examples of the method may include rotating the handle 102 about an axis A extending radially relative to the lock-ring 32 including the first opposing ring section end 48a and the second opposing ring section end 48b. As noted above, some examples of the handle 102 may include a pin 124 associated with the handle body 104 (e.g., on a bottom side of the handle body 104), and the coupler plate 46 may define a hole 126 on the plate outer surface 66 of the coupler plate 46. For some such examples, engaging the handle 102 with the coupler plate 46 may include engaging the pin 124 with the hole 126, and rotating the handle 102 about the axis A, such that the first end 106 of the handle body 104 engages the coupler plate 46, and the second end 108 of the handle body 104 engages the coupler plate 46. For example, the first slot 116a of the first engagement fixture 110 may engage the first coupler slot 74a, and the second slot 116b of the second engagement fixture 112 may engage the second coupler slot 74b.

As shown in FIG. 10E, according to some examples, engaging the handle 102 with the coupler plate 46 may also include coupling the handle 102 to the coupler plate 46 via at least one fastener 84. For example, the at least one fastener 84 may have include at least one fastener 84 previously coupling the coupler plate 46 and the first opposing ring section end 48a or the second opposing ring section end 48b to one another, as previously described herein.

FIGS. 11, 12A, 12B, 13 and 14 illustrate further examples of detachable handle 102 for use in engaging with and manipulating lock-ring 32. As shown in FIGS. 11 and 12A, handle 102 may have a handle body axis H that is oblique to, and substantially orthogonal with, grip axis G. In this arrangement, grip 114 provides different leverage for maneuvering lock-ring 32 than with a configuration having handle body axis H substantially parallel to grip axis G. Grip 114 shown in FIGS. 11 and 12A may comprise a rubberized or similarly pliable material to improve friction and comfort with the palm of a user's hand. Separation of opposing ring section ends 48a and 48b from one another and engagement of handle 102 in FIGS. 11 and 12A may occur in substantially the same manner for handle 102 as described above for FIGS. 10A through 10E.

FIG. 12B depicts a side section view of the example handle 102 of FIG. 12A as engaged within the retracted lock-ring 32. When engaged, the vertical portion of handle 102 is centered over and substantially orthogonal to lock-ring 32. As a result, handle 102 is positioned to provide firm balance and control over the mass of lock-ring 32 as it may be lifted or otherwise maneuvered.

Figure 13:
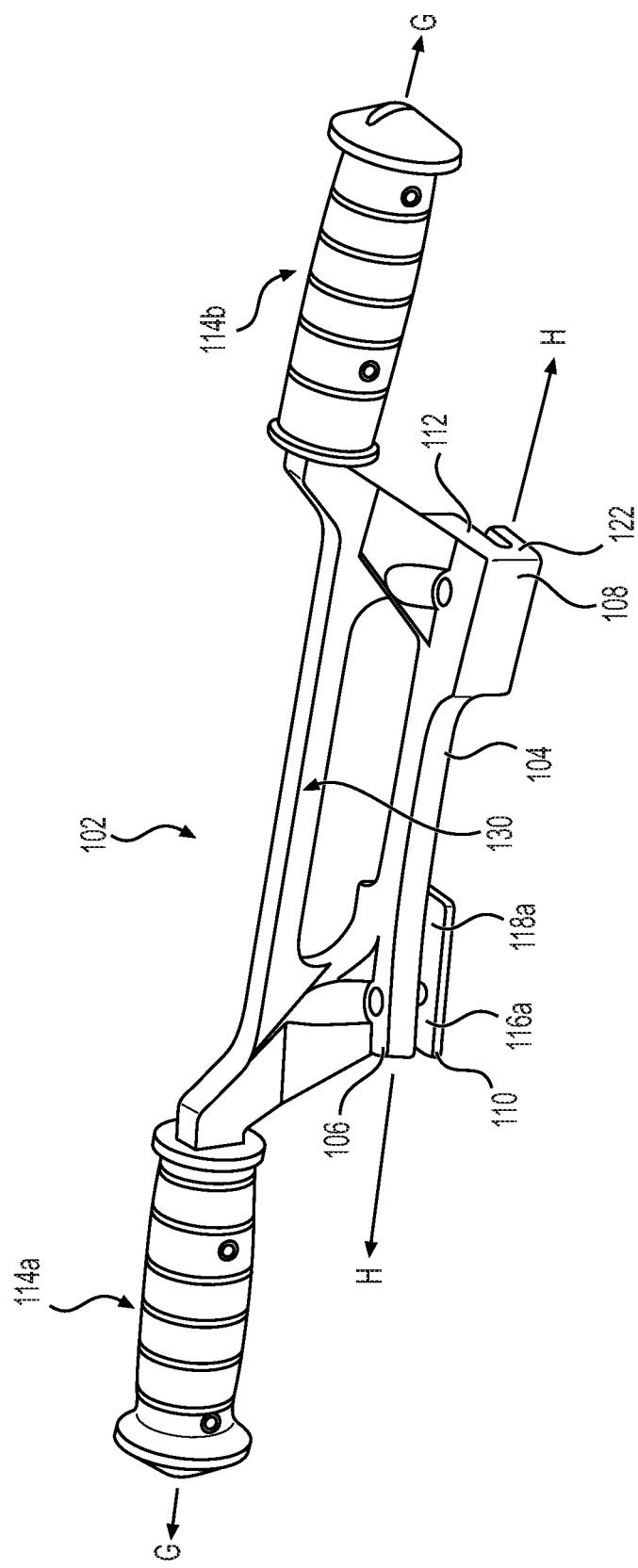
FIG. 13 is a schematic perspective view of another example handle having two grips.
Figure 14:
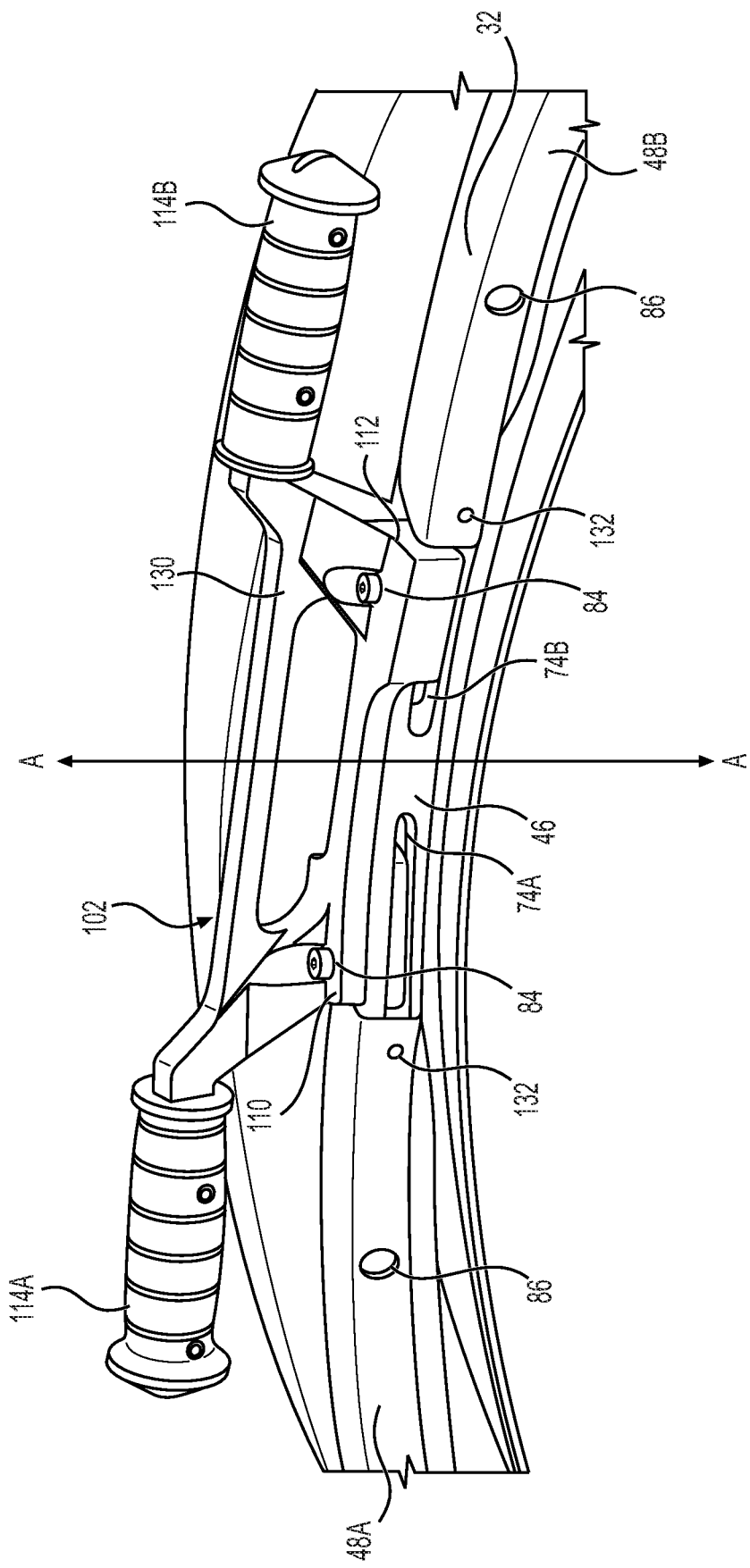
FIG. 14 is a schematic partial perspective view of the example handle shown in FIG. 13 engaged in opposing ring section ends.
Figure 15:
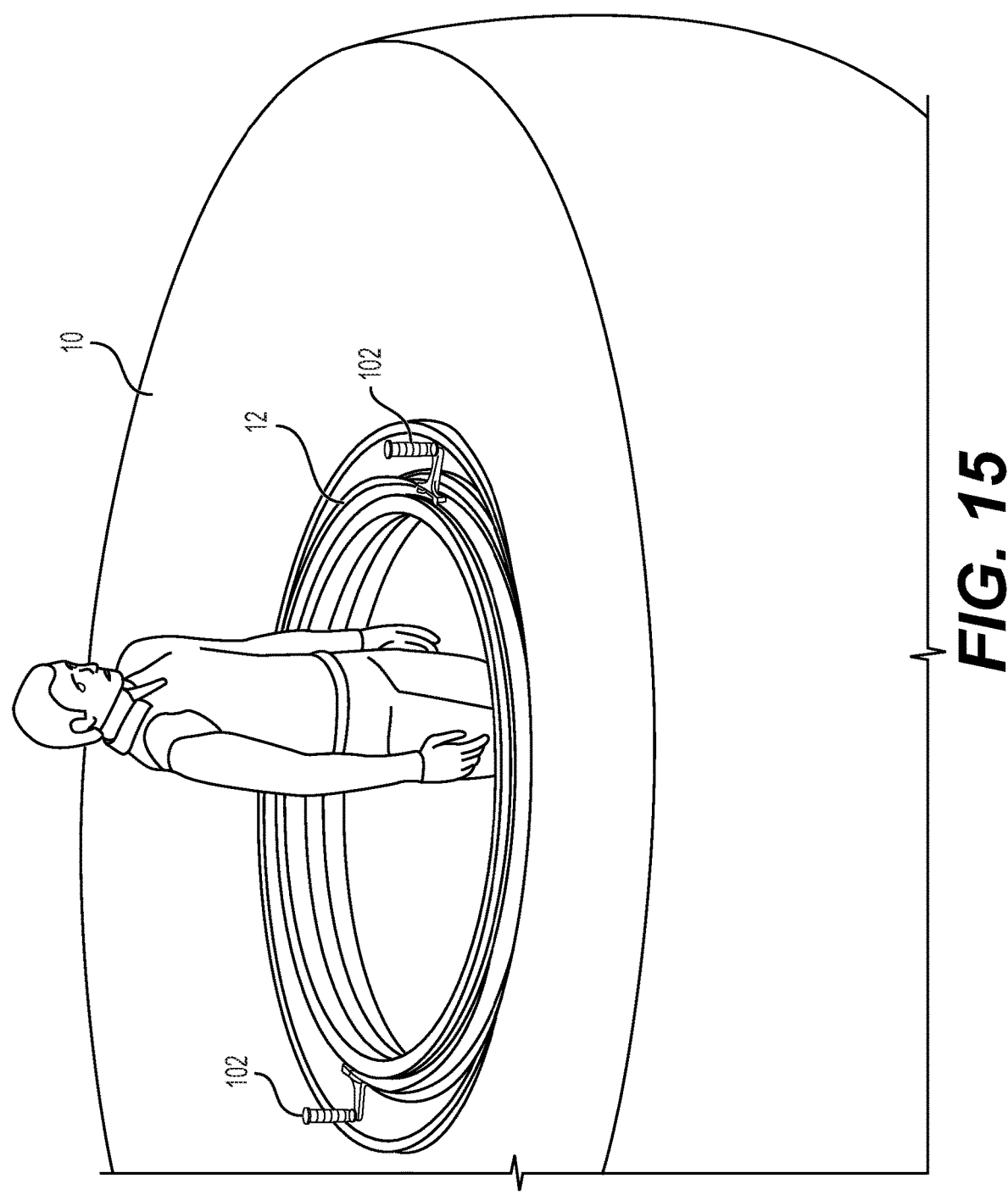
FIG. 15 is a schematic perspective view of an example tire and wheel assembly including two example handles engaged with opposing ring section ends of two example lock-ring sections.

FIGS. 13 and 14 illustrate yet another example of detachable handle 102 for use in engaging with and manipulating lock-ring 32. In this embodiment, handle 102 includes a plurality of grips, depicted in FIG. 13 as two grips 114a and 114b. Grips 114a and 114b are substantially aligned along a common grip axis G, although they may be positioned to be oblique or substantially parallel with respect to each other. In some examples, either or both of grips 114a and 114b may be angled radially downwardly to provide improved clearance from surrounding structures.

The two grips 114a and 114b provide added leverage for a user to manipulate lock-ring 32 particularly in applications where the wheel has substantial diameter and mass relative to a user's size and strength, such as with a wheel assembly 12 having a 63-inch diameter. To assist with this leverage, common grip axis G and handle body axis H may be substantially co-planar as depicted in FIG. 14. In this arrangement, handle 102 and grips 114a and 114b are substantially centered along the mass centerline of lock-ring 32, providing for stable and balanced maneuvering of lock-ring 32.

A tie brace 130 may extend between grips 114a and 114b. Tie brace 130 may provide stability and strength to handle 102 to assist in bearing the forces imparted when a user lifts lock-ring 32 using both grips 114a and 114b. Tie brace 130 is depicted as having a rectangular cross-section, although a round, oval, or other shaped cross-section may equally suffice. Tie brace 130 also provides an alternative structure to grips 114a and 114b for a user to grasp and hold handle 102.

Installing handle 102 onto lock-ring 32 may occur in the same manner described above in FIGS. 10A, 10B, 10C, 10D, and 10E, regarding separating opposing ring ends 48. As addressed above, such as shown in FIG. 5, prior to the retraction of first opposing ring section end 48a and second opposing ring section end 48b, fasteners 84 secure the opposing ring sections to coupler plate 46. A first step in the separation process involves removing one or more fasteners 84. While shown in FIG. 5 as cap screws, a fastener 84 on each end of coupler plate 46, such as the fastener 84 passing through the first ring aperture 62 in first ring side wall 58, may alternatively be a rolled pin or similar structure, which is depicted in FIG. 14 as pins 132. Pins 132, which are not readily removable from handle 102, make it clear to a user which fasteners are to be removed in the process.

In some examples, with pin 132 serving as fastener 84, a split pin joint is formed that remains in place and slidably retains the respective opposing ring section 48a or 48b to coupler plate 46 while providing an increased amount of retained movement between the parts. Moreover, the steps of separating first opposing ring section end 48a and second opposing ring section end 48b can proceed by loosening and removing fewer cap screws (or similar fasteners) on each end of coupler plate 46 than if cap screws are used for all fasteners. After fasteners 84 are removed from apertures 86 with optional pins 132 being kept in place, first ring section end 48a and second ring section end 48b may be slid apart from each other exposing at least a central portion of coupler plate 46, as described above. Pins 132 will maintain at least a loose attachment between each ring section end 48 and coupler plate 46. In other examples, cap screws or similar devices requiring tightening and loosening may be used in place of pins 132 to achieve a similar result, a goal being to minimize a number of detached fasteners and other parts when separating lock-ring section ends 48a and 48b and then engaging handle 102.

After removing fasteners 84, handle 102 in FIG. 14 may be installed onto the exposed coupler plate 46 in a similar manner as described above for handle 102 having a single grip. In particular, handle 102 may be angled axially and lowered radially onto coupler plate 46. Then, handle 102 may be rotated about an axis A extending radially relative to lock-ring 32. Having oppositely facing first engagement fixture 110 and second engagement fixture 112 with respective slots 116a and 116b, handle 102 may be rotated such that slots 116a and 116b engage with first and second coupler slots 74a and 74b, respectively, of coupler plate 46. In some examples, the fasteners 84 removed from each opposing ring section end 48a and 48b to start the separation process may be installed radially into handle 102 and pass into aligned first and second coupler apertures 92 and 94. Tightening fasteners 48 will secure handle 102 into place on coupler 46 and between respective ends 48 of lock-ring 32, as shown in FIG. 14. By using pins 132 or similar connectors to maintain a slidable connection between coupler plate 46 and respective ring section ends 48a and 48b, and by using fasteners 84 from holes 86 to secure handle 102 in place, extra or detached fasteners during and after the process may be minimized or eliminated, in some examples.

The example method for separating opposing ring section ends 48 from one another described above may be incorporated into a method for handling a lock-ring system 44 including one or more lock-ring sections 42. For example, the method may include separating opposing ring section ends 48 of the one or more lock-ring sections 42, for example, according to at least some examples of the above-noted method. The method for handling a lock-ring system 44 may also include grasping the handle 102, for example, by one or more grip portions 114, and repositioning the lock-ring system 44 relative to a wheel assembly 12. In some examples, the lock-ring system 44 may include a number of lock-ring sections 42 coupled to one another, and the method may also include coupling a number of handles 102 to the plurality of lock-ring sections 42, for example, such that the number of lock-ring sections 42 equals the number of handles 102. For example, the lock-ring system 44 may include two lock-ring sections 42 coupled to one another, and the method may include coupling each of two handles 102 to each of the two lock-ring sections 42.

In some examples of the method, repositioning the lock-ring system 44 may include sliding the lock-ring system 44 off the wheel assembly 12. For example, a person may grasp the two handles 102 and slide the lock-ring system 44 off the wheel assembly 12. In some examples of the method, a first person may grasp a first of the two handles 102 and another person may grasp a second of the two handles 102. This example might be useful for removing a relatively large lock-ring system 44 (e.g., for a 57-inch through 63-inch diameter (or greater) wheel assembly 12). Other numbers of handles 102, lock-ring sections 42, and/or people are contemplated, for example, for larger diameter wheel assemblies.

The example method for separating opposing ring section ends 48 from one another described above may be incorporated into a method of removing a tire 10 from a wheel assembly 12. For example, any one of the above-noted methods may be performed, followed by sliding the tire 10 off the wheel assembly 12. In some examples, the methods for disassembling the wheel assembly 12 described previously herein may be incorporated into such methods for removing a tire 10 from a wheel assembly 12.

FIG. 13 is a schematic perspective view of an example tire 10 and wheel assembly 12 including two example handles 102 engaged with opposing ring section ends 48 of two example lock-ring sections 42. In FIG. 13, the example tire 10 and wheel assembly 12 are shown resting on a side wall of the tire 10. In some examples, the tire 10 may be mounted to and/or removed from the wheel assembly 12 with the tire 10 and wheel assembly in an upright orientation. For example, a portion of the machine on which the tire 10 and wheel assembly 12 is mounted may be raised, so that the bottom of the tire 10 is spaced above the ground. Thereafter, one or more of the methods described above may be performed to mount and/or remove the tire 10 from the wheel assembly 12.

While aspects of the present disclosure have been particularly shown and described with reference to the embodiments above, it will be understood by those skilled in the art that various additional embodiments may be contemplated by the modification of the disclosed machines, systems, and methods without departing from the spirit and scope of what is disclosed. Such embodiments should be understood to fall within the scope of the present disclosure as determined based upon the claims and any equivalents thereof.

What is claimed is:
1. A lock-ring system comprising:
   a lock-ring section configured to at least partially define an annular lock-ring and define a curved longitudinal axis extending along a length of the lock-ring section between a first ring section end and a second ring section end, the lock-ring section defining a ring cross-section perpendicular to the longitudinal axis, the ring cross-section comprising:
a ring radial-outer surface;
a ring radial-inner surface opposite the ring radial-outer surface, the ring radial-inner surface defining a ring recess;
a first ring side wall;
a second ring side wall opposite the first ring side wall, wherein the ring recess is substantially enclosed within the ring radial-outer surface, the first ring side wall, and the second ring side wall;
wherein the lock-ring section comprises:
a first ring aperture defined adjacent the first ring section end and extending between one of:
the first ring side wall and the second ring side wall; or
the ring radial-outer surface and the ring radial-inner surface;
a second ring aperture defined adjacent the second ring section end and extending between one of:
the first ring side wall and the second ring side wall; or
the ring radial-outer surface and the ring radial-inner surface; and
a coupler plate configured to be received in the ring recess of the lock-ring section and to couple the first ring section end to one of the second ring section end or a ring section end of a second lock-ring section, the coupler plate comprising:
a plate radial-outer surface;
a plate radial-inner surface opposite the plate radial-outer surface;
a first plate side wall; and
a second plate side wall opposite the first plate side wall,
wherein the coupler plate defines a coupler slot extending between one of:
the first plate side wall and the second plate side wall; or
the plate radial-outer surface and the plate radial-inner surface.

2. The lock-ring system of claim 1, wherein the ring recess is defined between the first ring side wall and the second ring side wall.

3. The lock-ring system of claim 1, wherein the ring recess is substantially enclosed, such that at least a portion of the length of the lock ring section is substantially tubular.

4. The lock-ring system of claim 1, wherein the first ring aperture and the second ring aperture extend between the first ring side wall and the second ring side wall.

5. The lock-ring system of claim 1, further comprising:
a third ring aperture defined adjacent the first ring aperture and extending between one of:
the first ring side wall and the second ring side wall; or
the ring radial-outer surface and the ring radial-inner surface; and
a fourth ring aperture defined adjacent the second ring aperture end and extending between one of:
the first ring side wall and the second ring side wall; or
the ring radial-outer surface and the ring radial-inner surface.

6. The lock-ring system of claim 1, wherein the coupler plate defines a coupler longitudinal axis extending along a length of the coupler plate between a first coupler end and a second coupler end, and wherein the coupler longitudinal axis is curved.

7. The lock-ring system of claim 1, wherein the coupler plate received in the ring recess is encapsulated by the lock-ring section, at least one fastener secures the lock-ring section to the coupler plate, and a head of the at least one fastener does not protrude above the ring radial-outer surface.

8. The lock-ring system of claim 1, wherein the coupler slot is configured and located such that the lock-ring may be removed from a rim base without separating the coupler plate from the first ring section end.

9. The lock-ring system of claim 1, further comprising at least one of:
a first coupler aperture extending perpendicular to the first coupler slot and configured to receive a first fastener and extending between one of:
the first plate side wall and the second plate side wall; or
the plate radial-outer surface and the plate radial-inner surface; or
a second coupler aperture extending perpendicular to the second coupler slot and configured to receive a second fastener and extending between one of:
the first plate side wall and the second plate side wall; or
the plate radial-outer surface and the plate radial-inner surface,
wherein the first coupler aperture and the second coupler aperture are positioned such that, with a fastener in each of the first coupler aperture and the second coupler aperture, the first ring section end and the second ring section end maintain a separation from one another sufficient for the lock-ring to be removed from a rim base without separating the coupler plate from the first ring section end and the second ring section end.

10. The lock-ring system of claim 1, further comprising:
a detachable handle configured to be engaged with the coupler plate between the first ring section end and one of the second ring section end or a ring section end of a second lock-ring section, the handle comprising:
a handle body extending between a first end and a second end; a first engagement fixture adjacent the first end;
a second engagement fixture adjacent the second end; and
a grip portion coupled to the handle body and configured to facilitate holding the handle.

11. The lock-ring system of claim 10, wherein the first engagement fixture comprises a first slot defining a first open end facing a first direction and the second engagement fixture comprises a second slot defining a second open end facing a second direction, and wherein the first direction and the second direction are opposite one another.

12. The lock-ring system of claim 10, wherein the first end defines a first stop portion and the second end defines a second stop portion, and wherein the first stop portion and the second stop portion are configured to substantially maintain spacing between opposing ring section ends.

13. The lock-ring system of claim 10, further comprising a pin coupled to the handle body and configured to engage a hole in a coupler configured to couple opposing ring section ends to one another.

14. A lock-ring section configured to at least partially form an annular lock-ring, the lock-ring section defining:
a curved longitudinal axis extending along a length of the lock-ring section between a first ring section end and a second ring section end; and a ring cross-section perpendicular to the longitudinal axis, the ring cross-section comprising:
   a ring radial-outer surface;
   a ring radial-inner surface opposite the ring radial-outer surface, the ring radial-inner surface defining a ring recess configured to at least partially receive a coupler plate;
   a first ring side wall;
   a second ring side wall opposite the first ring side wall, wherein the ring recess is substantially enclosed within the ring radial-outer surface, the first ring side wall, and the second ring side wall;
wherein the lock-ring section comprises:
   a first ring aperture defined adjacent the first ring section end and extending between one of:
      the first ring side wall and the second ring side wall; or
      the ring radial-outer surface and the ring radial-inner surface;
   a second ring aperture defined adjacent the second ring section end and extending between one of:
      the first ring side wall and the second ring side wall; or
      the ring radial-outer surface and the ring radial-inner surface.

15. The lock-ring section of claim 14, wherein the ring recess is defined between the first ring side wall and the second ring side wall.

16. The lock-ring section of claim 14, wherein the ring recess is substantially enclosed, such that at least a portion of the length of the lock-ring section is substantially tubular.

17. The lock-ring section of claim 14, wherein the first ring aperture and the second ring aperture extend between the first ring side wall and the second ring side wall.

18. The lock-ring section of claim 14, further comprising:
   a third ring aperture defined adjacent the first ring aperture and extending between one of:
      the first ring side wall and the second ring side wall; or
      the ring radial-outer surface and the ring radial-inner surface; and
   a fourth ring aperture defined adjacent the second ring aperture end and extending between one of:
      the first ring side wall and the second ring side wall; or
      the ring radial-outer surface and the ring radial-inner surface.

* * * * *